(12) United States Patent
Yang

(10) Patent No.: US 9,516,330 B2
(45) Date of Patent: Dec. 6, 2016

(54) VIRTUAL FIELD BUFFER BASED DECODING

(71) Applicant: Broadcom Corporation, Irvine, CA (US)

(72) Inventor: Zhijie Yang, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 367 days.

(21) Appl. No.: 13/782,425

(22) Filed: Mar. 1, 2013

(65) Prior Publication Data

US 2014/0219332 A1 Aug. 7, 2014

Related U.S. Application Data

(60) Provisional application No. 61/761,489, filed on Feb. 6, 2013.

(51) Int. Cl.

| | |
|---|---|
| *H04N 19/423* | (2014.01) |
| *H04N 5/12* | (2006.01) |
| *H04N 5/265* | (2006.01) |
| *H04N 7/12* | (2006.01) |
| *H04N 19/44* | (2014.01) |
| *H04N 19/16* | (2014.01) |

(Continued)

(52) U.S. Cl.
CPC ............ *H04N 19/423* (2014.11); *H04N 19/44* (2014.11); *H04N 19/16* (2014.11)

(58) Field of Classification Search
CPC ............ H04N 7/12; H04N 5/12; H04N 5/265; G06K 9/36; G06T 1/20
See application file for complete search history.

(56) References Cited

U.S. PATENT DOCUMENTS

| 5,495,294 A | * | 2/1996 | Evans et al. ................ 348/536 |
| 2005/0201471 A1 | * | 9/2005 | Hannuksela et al. .... 375/240.25 |
| 2005/0207490 A1 | * | 9/2005 | Wang et al. ............. 375/240.15 |

(Continued)

OTHER PUBLICATIONS

Bross et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1 SC 29/WG 11 12th Meeting: Geneva, CH (Jan. 2013).

*Primary Examiner* — Geepy Pe
*Assistant Examiner* — Patricia I Young
(74) *Attorney, Agent, or Firm* — Foley & Lardner LLP; Christopher J. McKenna; Daniel E. Rose

(57) ABSTRACT

Aspects of virtual field buffer based decoding are described. In one embodiment, a current picture field is read from a coded picture buffer comprising coded pictures of video, for example. The current picture may be associated with a top or bottom field polarity. According to decoding and picture output orders, the current picture field is assigned to an available field entry of a virtual field buffer, and an available frame index of a virtual frame map is assigned to the current picture field. The assignment of the available frame index to the current picture field is indicated to a decoder that decodes the current picture field with reference to the assigned frame index. According to aspects of the embodiments described herein, rather than determining complimentary picture fields after decoding, the assignment of complimentary picture fields to virtual frame indexes before decoding provides certain efficiencies.

23 Claims, 14 Drawing Sheets

(51) Int. Cl.
  *G06K 9/36* (2006.01)
  *G06T 1/20* (2006.01)

(56) References Cited

U.S. PATENT DOCUMENTS

2007/0280358 A1* 12/2007 Chen et al. .............. 375/240.25
2009/0002379 A1* 1/2009 Baeza et al. ................. 345/522
2009/0238482 A1* 9/2009 Kim et al. ................... 382/238
2013/0229548 A1* 9/2013 Masuko ....................... 348/239

* cited by examiner

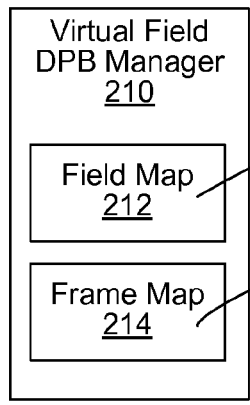

- Entry Available Flag
- Corresponding Picture Command Index
- Reference Picture Flag
- Reference Data

- Frame DPB Index (FrameIDX)
- Corresponding Address in Frame-Based DPB

- Number of Unpaired Top Field Pictures
- Number of Unpaired Bottom Field Pictures
- Picture Order Count
- Decoding Order

FIG. 2A

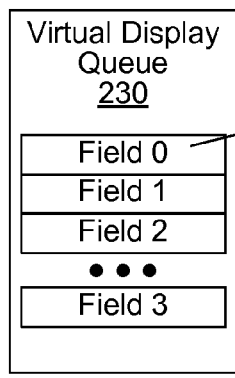

- Field Polarity
- Corresponding Frame DPB Index (FrameIDX)
- Needed for Decoding Flag
- Needed for Output Flag

FIG. 2B

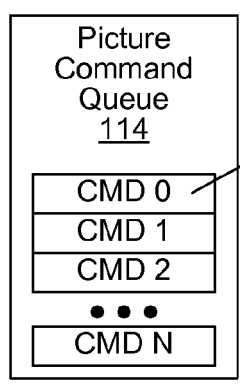

- Picture/Slice Header Data
- Picture/Slice Address Data
- Reference Picture List
- Field Polarity
- Frame DPB Index (FrameIDX)

FIG. 2C

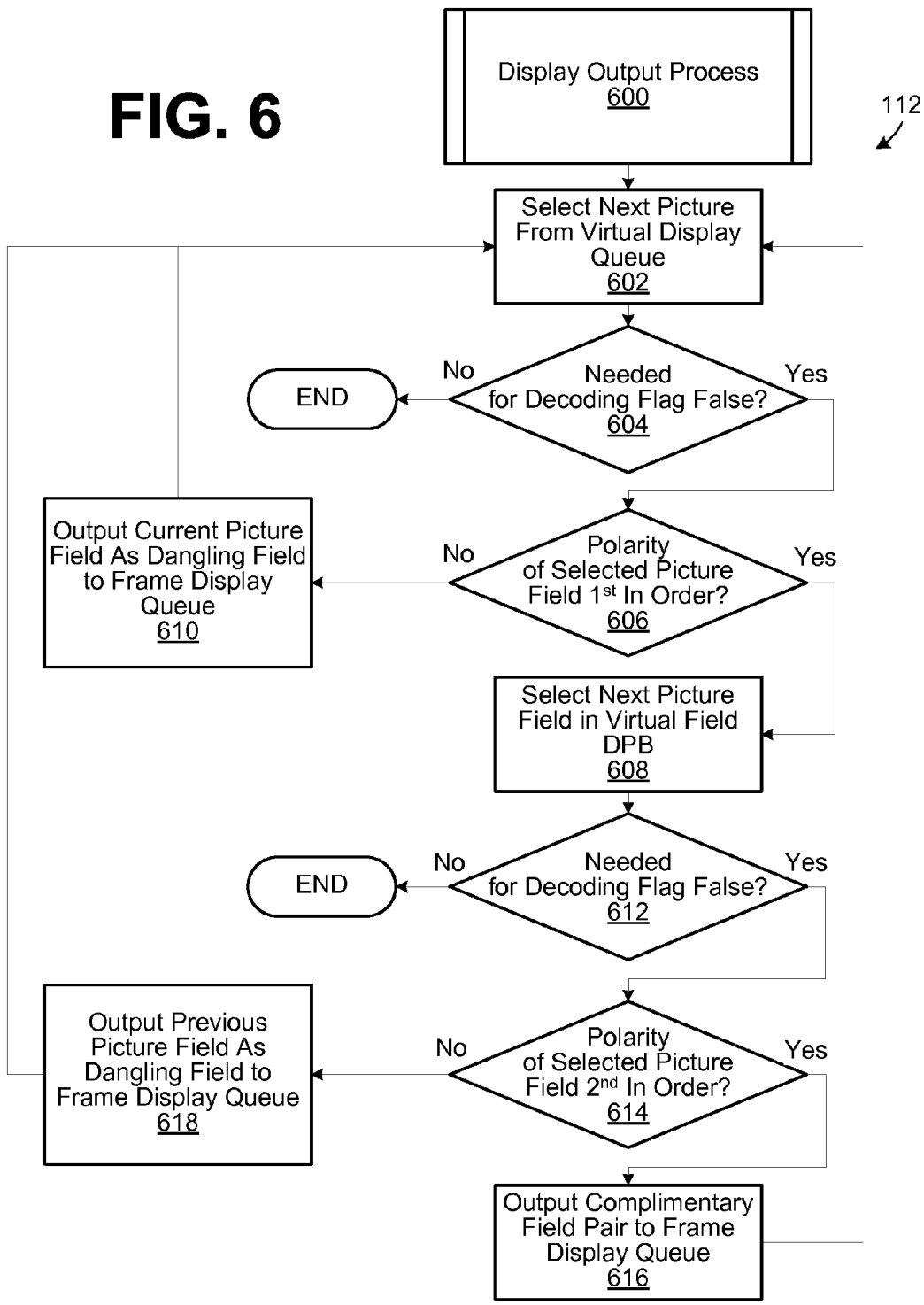

VIRTUAL FIELD BUFFER BASED DECODING

CROSS-REFERENCE TO RELATED APPLICATIONS

This application claims the benefit of U.S. Provisional Application No. 61/761,489, filed Feb. 6, 2013, the entire contents of which is hereby incorporated herein by reference.

BACKGROUND

Video compression techniques generally rely on data coding to reduce an amount of data in a video bitstream by removing redundancy in the video bitstream. Some compression techniques rely upon spatial and temporal compression and compensation.

It is noted that video signals are commonly composed as either progressive or interlaced scan signals. Interlaced signals have been relied upon for some time and were the primary means for transmitting signals to analog televisions. An interlaced frame comprises two fields in a sequence, each sequentially scanned at odd and even lines of an image sensor.

It is also noted that, as an extension of video coding techniques, such as the MPEG-1, H.262/MPEG-2, H.263, H.264/MPEG-4, and AVC coding techniques, High Efficiency Video Coding (HEVC) is being evaluated as a new video coding standard of the International Telecommunication Union (ITU) Video Coding Experts Group and the Moving Picture Experts Group (MPEG). HEVC seeks to improve compression performance by 50% as compared to current standards.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2A illustrates various data metrics stored in and accounted for by a virtual field decoded picture buffer manager of the decoder of FIG. 1.

FIG. 2B illustrates various data metrics stored in and accounted for by a virtual display queue of the decoder of FIG. 1.

FIG. 2C illustrates various data metrics stored in and accounted for by a picture command queue of the decoder of FIG. 1.

FIG. 6 illustrates an example process flow of a display output process performed by the decoder of FIG. 1 according to an example embodiment.

DETAILED DESCRIPTION

Figure 1:
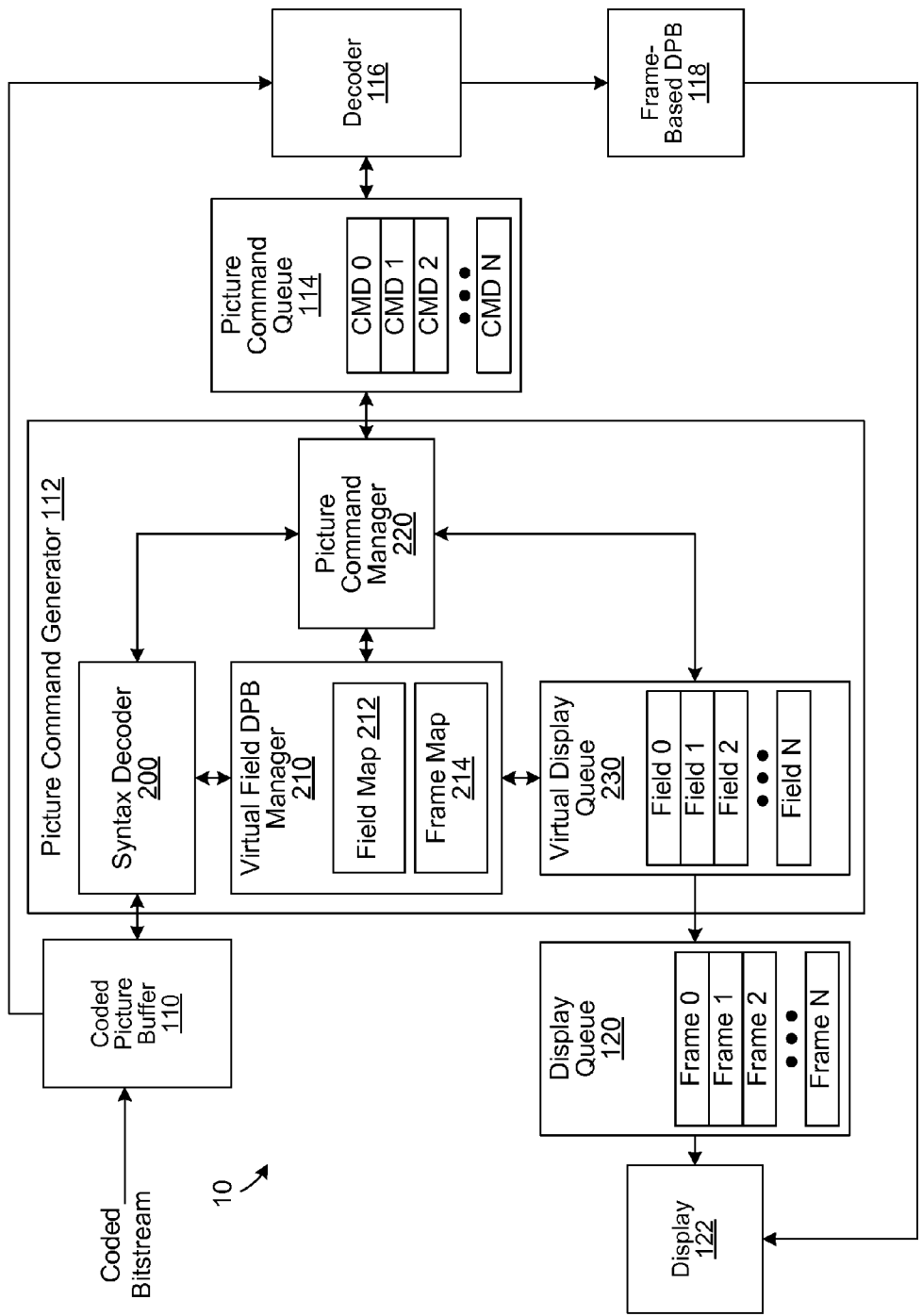
FIG. 1 illustrates an example virtual field buffer decoder according to various embodiments described herein.

Video compression techniques generally rely on data coding to reduce an amount of data in a video bitstream by removing redundancy in the video bitstream. Some compression techniques rely upon spatial and temporal compression and compensation. Some video compression techniques rely upon lossy compression algorithms. In such a case, the original video bitstream cannot be reconstructed entirely when decoded. In return, the lossy MPEG-4 compression standard, for example, may reduce a volume of video data by a significant factor. It is noted that most lossy compression standards require a tradeoff between video quality and processing requirements.

It is also noted that video signals are commonly composed as either progressive or interlaced scan signals, although progressive scan signals are becoming more common. Interlaced signals have been relied upon for some time and were the primary means for transmitting signals to analog televisions. An Interlaced frame comprises two fields in a sequence, each sequentially scanned at odd and even lines of an image sensor, for example. In other words, progressive signals send an entire frame at once, while interlaced signals send a first half of an image and, afterwards, a second half of the image. Generally, every other line of an image is scanned when the first half is transmitted, and the remaining lines are scanned when the second half is transmitted. Each half of an interlaced image is typically referred to as a field. Interlaced signals are commonly used in standard (i.e., analog) television and 1080i broadcasts.

In some aspects, interlaced signals must be reproduced in an interlaced format to avoid the generation of video artifacts. In other words, if an interlaced signal is displayed in a progressive format, movement artifacts may be generated. To some extent, deinterlacing can reduce artifacts associated with the change in formats. To perform deinterlacing, two corresponding fields need to be combined into a single frame.

As an extension of video coding techniques, such as the MPEG-1, H.262/MPEG-2, H.263, H.264/MPEG-4, and AVC coding techniques, High Efficiency Video Coding (HEVC) is being considered as a new video coding standard of the International Telecommunication Union (ITU) Video Coding Experts Group and the Moving Picture Experts Group (MPEG). HEVC seeks to improve compression performance by about 50% as compared to current standards.

It is noted that the HEVC coding technique is generally expected to be used for coding progressive scan imagery, because interlaced scanning is not used in new displays. Thus, interlaced scanning is becoming less common as a means for distribution. As such, the HEVC coding technique does not include any explicit coding features to support interlaced scan imagery. Still, HEVC provides a metadata syntax to indicate whether interlaced scan video has been coded. If interlaced scan video has been coded, each picture may be coded as an HEVC coded picture field having a field polarity. In this manner, interlaced video coding can be supported by HEVC coders and decoders without any specific HEVC decoding processes. In certain aspects, however, new techniques must be employed to further support interlaced video coding and decoding when relying upon the HEVC standard.

In this context, aspects of virtual field buffer based decoding are described herein. In one embodiment, a current picture field is read from a coded picture buffer comprising coded pictures of video, for example. The current picture may be associated with a top or bottom field polarity. According to decoding and picture output orders, the current picture field is assigned to an available field entry of a virtual field buffer, and an available frame index of a virtual frame map is assigned to the current picture field. The assignment of the available frame index to the current picture field is indicated to a decoder that decodes the current picture field with reference to the assigned frame index. According to aspects of the embodiments described herein, rather than determining complimentary picture fields after decoding, for example, the assignment of complimentary picture fields to frames before decoding provides certain efficiencies and further supports interlaced video coding and decoding when relying upon certain standards such as HEVC.

Turning now to the drawings, a general description of exemplary embodiments of a virtual field buffer based decoding system and its components are provided, followed by a discussion of the operation of the same.

FIG. 1 illustrates an example virtual field buffer decoder 10 according to various embodiments described herein. The virtual field buffer decoder 10 comprises a coded picture buffer 110, a picture command generator 112, a picture command queue 114, a decoder 116, a frame-based decoded picture buffer (DPB) 118, a display queue 120, and a display 122. The virtual field buffer decoder 10 may comprise an element of a larger video communication system. Generally, in such a video communication system, pictures or images are captured for transmission as a video sequence. The pictures are encoded, encapsulated into packets according to a transmission protocol, and sent to a receiver through a transmission channel. At the receiver, the received packets are decapsulated, and the coded pictures are stored in a buffer for decoding and display.

In this context, a received coded bitstream is stored in the coded picture buffer 110, as illustrated in FIG. 1. In one example embodiment, the coded bitstream of FIG. 1 comprises a video bitstream encoded by the HEVC standard (i.e., H.265). In various embodiments, however, the coded bitstream may be encoded by other encoding formats or standards. The coded picture buffer 110 stores the coded video bitstream for further processing by the picture command generator 112 and the decoder 116. The coded video bitstream may comprise coded picture fields, where each picture field comprises or is associated with a field polarity. In various embodiments, if picture fields in the coded bitstream are to be output to the display 122 as progressive scan imagery, then picture frames may be composed from certain pairs of the picture fields stored in the coded picture buffer. In that context, the picture command generator 112 determines the pairs, as described below.

The picture command generator 112 maintains virtual field and frame maps, and generates picture commands for the picture command queue 114. The virtual field and frame maps are relied upon by the picture command generator 112 to determine complementary pairs of picture fields for picture frames. As instructed by picture commands generated by the picture command generator 112, the decoder 116 retrieves coded picture fields from the coded picture buffer 110, decodes them, and stores them in the frame-based DPB 118. After being decoded by the decoder 116, the frame-based DPB 118 stores decoded pictures. It is noted that, in various embodiments, the frame-based DPB 118 stores pairs of decoded picture fields, in association with each other, as picture frames. In certain embodiments, the frame-based DPB 118 may store decoded frames, where each frame comprises a combination of picture fields.

The display queue 120 stores references to pictures frames (e.g., Frame 0, Frame 1, Frame 2, . . . , and Frame N, etc.) for output by the display 122. The references stored in the display queue 120 may refer to storage locations in the frame-based DPB 118. Thus, with reference to the display queue 120, the display 122 retrieves and displays picture frames from the frame-based DPB 118.

As illustrated, the picture command generator 112 comprises a syntax decoder 200, a virtual field DPB manager 210, a picture command manager 220, and a virtual display queue 230. The syntax decoder 200 accesses the coded picture buffer 110 and parses header and/or syntax layer elements of one or more pictures of the coded picture bitstream. For example, the syntax decoder 200 may ascertain or determine one or more of the following: the start and end of coded video slices; a picture order count (POC) of a sequence of pictures; a sequence of pictures for output; a decoding order of a sequence of pictures; a first field (i.e., top or bottom field polarity) in output order; the identification of reference and non-reference pictures; instantaneous decoding refresh (IDR) pictures; system timestamps; and a size of a decoding buffer required for decoding (e.g., a maximum decoded picture buffer size, maxDPBSize). In various embodiments, the syntax decoder 200 may ascertain or determine other header and/or syntax layer elements.

The virtual field DPB manager 210 maintains virtual field and frame maps 212 and 214, as illustrated in FIG. 1. The virtual field map 212 refers to fields of the virtual display queue 230, in various embodiments, as further described below. In connection with the virtual field map 212 and/or the virtual display queue 230, the virtual field DPB manager 210 assigns picture fields stored in the coded picture buffer 110 to available field entries of the virtual field map 212 and/or the virtual display queue 230. Further, the virtual field DPB manager 210 assigns available frame indexes of the virtual frame map 214 to assigned picture fields of the virtual field map 212 and/or the virtual display queue 230. The virtual field map 212 and virtual display queue 230 may include field information for several fields (e.g., Field 0, Field 1, Field 2, . . . , Field N, etc.). Similarly, the virtual frame map 214 may include frame information for several frames. In certain aspects, the size of one or more of the virtual field map 212, the virtual display queue 230, and the virtual frame map 214 may depend, in part, on the maximum decoded picture buffer size maxDPBSize.

Rather than storing actual picture or imagery content itself, the virtual field and frame maps 212 and 214 and the virtual display queue 230 are relied upon by the picture command generator 112 as a type of memory scratch space for determining an assignment of interlaced scan imagery fields to frames, in connection with the decoding of those fields by the decoder 116. It is again noted that, for interlaced scan imagery, complementary picture fields are generally paired before being displayed. In certain aspects according to the embodiments described herein, the pairing of complementary picture fields to picture frames is performed at the direction of the picture command generator 112. The pairing of complementary picture fields to frames before decoding may be more efficient in certain aspects than pairing complementary picture fields to frames after decoding. For example, pairing before decoding may be more efficient because more coded-bitstream information is generally available before decoding than after decoding. Additionally, in a system that typically operates with frame-based or progressive scan imagery, the pairing of complementary picture fields to frames before decoding allows the reuse of circuitry designed for frame-based or progressive scan imagery. In other words, according to certain aspects of the embodiments described herein, the reuse of certain frame-based decoding circuitry and/or buffers may be achieved—even when operating with coded interlaced scan imagery.

The picture command manager 220 generates picture commands for processing by the decoder 116. The picture commands are stored in the picture command queue 114, and it is noted that several picture commands (e.g., CMD 0, CMD 1, CMD 2, . . . , and CMD N, etc.) may be stored in the queue 114. As described in further detail below, the decoder 116 examines the picture commands stored in the picture command queue 114, to determine which coded picture fields have been assigned to virtual frames by the picture command generator 112. In other words, before decoding picture fields, the decoder 116 references field-to-frame pairings identified by the picture command generator 112. In turn, the decoder 116 may output decoded picture fields in terms of complimentary fields or frames for storage. In various embodiments, complimentary fields may be stored in the frame-based DPB 118 in association with each other, for example, or in the form of a combination of fields.

Turning to FIG. 2A, various data metrics stored in and accounted for by the virtual field DPB manager 210 of the decoder 10 of FIG. 1 are illustrated. According to one example embodiment, the virtual field map 212 of the virtual field DPB manager 210 maintains, for each field Field 0, Field 1, Field 2, . . . , and Field N of the virtual display queue 230, an entry available flag, a corresponding frame DPB index (FrameIDX), a reference picture flag, and reference picture data. The data metrics and fields described above as being stored by the field map 212 are provided by way of example only and should not be considered limiting, as additional or fewer data metrics or fields may be stored by the virtual field map 212.

The virtual frame map 214 of the virtual field DPB manager 210 maintains, for each frame in sequence of pictures, a FrameIDX and corresponding address for the FrameIDX in the frame-based DPB 118. The data fields described above as being stored by the virtual frame map 214 are provided by way of example only and should not be considered limiting, as additional or fewer data metrics or fields be stored by the virtual frame map 214.

In various embodiments, the virtual field DPB manager 210 also maintains counters of unpaired field pictures. In one embodiment, the virtual field DPB manager 210 maintains a counter of unpaired pictures of a first or top polarity and a counter of unpaired pictures of a second or bottom polarity. Additionally, the virtual field DPB manager 210 maintains a picture order count and decoding order for a slice of pictures in the coded picture buffer 110, as described in further detail below.

FIG. 2B illustrates various data metrics stored in and accounted for by the virtual display queue 230 of the decoder 10 of FIG. 1. According to one example embodiment, the virtual field DPB manager 210 maintains, for each field Field 0, Field 1, Field 2, . . . , and Field N in the virtual display queue 230, a field polarity, a corresponding FrameIDX, a needed for decoding flag, and a needed for output flag for the field. It is noted that, in exemplary embodiments, the picture fields Field 0, Field 1, Field 2, . . . , and Field N in the virtual display queue 230 are stored or ordered in the picture output order, as further described below. The data metrics and fields described above as being stored by the virtual display queue 230 are provided by way of example only and should not be considered limiting, as additional or fewer data metrics or fields may be stored by the virtual display queue 230.

FIG. 2C illustrates various data metrics stored in and accounted for by the picture command queue 114 of the decoder 10 of FIG. 1. According to one example embodiment, the picture command queue 114 maintains, for each picture command CMD 0, CMD 1, CMD 2, . . . , and CMD N, picture and/or slice header data, picture and/or slice address data, a reference picture list, a field polarity, and a FrameIDX for the command. The data described above as being stored for each command is provided by way of example only and should not be considered limiting, as additional or fewer data metrics may be stored by the picture command queue 114.

Figure 3A:
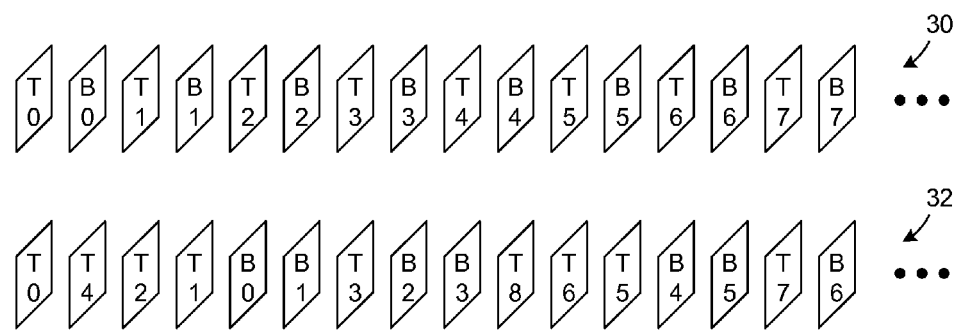
FIG. 3A illustrates example complementary field sequences, in output and decoding sequence orders, according to various embodiments described herein.

To better illustrate certain principles of the embodiments described herein, FIG. 3A illustrates example complementary field sequences 30 and 32 in output and decoding sequence orders, respectively, according to various embodiments described herein. The field sequence 30 represents an example sequence of picture fields in order for output. In the field sequence 30, the sequence comprises a top picture field T0 and a bottom picture field B0, among other picture fields. In the context of the decoder 10 of FIG. 1, the fields T0 and T1 may be output together as a frame by the display 122.

According to certain aspects, the fields in the sequence 30 have been encoded using a coding scheme that does not rely upon any particular specification or syntax for interlaced imagery. In other words, from the standpoint of the encoder used to encode the fields in the sequence 30, each field is treated as a full frame or picture for decoding—without any particular processing for interlaced imagery. It is noted that the fields in the field sequence 30 may be stored in the coded picture buffer 110 in various orders, based upon a received packet sequence or other factors, for example.

As compared to the field sequence 30 for output, the field sequence 32 is alternatively arranged or ordered for decoding. As illustrated, the field sequence 32 comprises the fields T0, T4, T2, and T1, in order, among other picture fields. It is noted that the difference between output and decoding orders may be attributable, in part, to the use of certain references pictures when encoding, as should be appreciated according to the specification of HEVC and other encoding techniques.

Figure 3B:
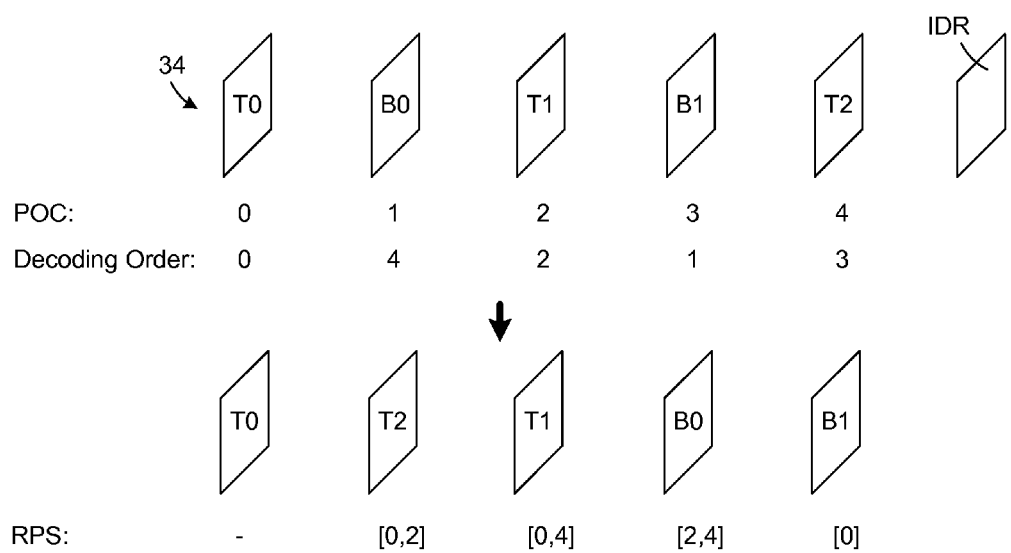
FIG. 3B illustrates an example picture sequence with example decoding order, example picture output order, and example reference picture sets.

FIG. 3B illustrates an example picture sequence 34, example decoding order, example picture output order, and example reference picture sets. In FIG. 3B, the picture sequence 34 comprises a picture sequence ordered in a display picture output order. Each picture in the picture sequence 34 may be identified by an index in the picture order count (POC). For a sequence of pictures stored in the coded picture buffer 110, the POC and indexes of the POC may be determined by the syntax decoder 200, based on syntax layer data in the coded picture buffer 110. The decoding order comprises a series of picture indexes in an order for decoding.

It is noted that, as specified by the coding technique, a picture is decoded with reference to its reference picture set (RPS). As illustrated, for example, pictures 0 and 2 are reference pictures for decoding picture 1. Similarly, pictures 0 and 4 are reference pictures for decoding picture 2. Further, when decoding the picture sequence 34, the picture order for decoding is picture 0, picture 4, picture 2, picture 1, and picture 3, as illustrated. Additionally, according to syntax layer data in the coded bitstream, the syntax decoder 200 may determine which field polarity (e.g., top or bottom) is first in the display output order. In the case of the picture sequence 34, top polarity fields are first for output.

It is also noted that when a picture sequence such as the picture sequence 34 is decoded by a decoder such as the decoder 10, the decoder does not know which picture fields comprise complimentary fields of a frame. In other words, in the context of the decoder 10 of FIG. 1, the coded bitstream does not include any data that identifies complimentary fields of a frame for interlaced imagery. According to aspects of the embodiments described herein, the picture command generator 112 determines complimentary picture field pairs among picture sequences, such as the picture sequence 34, before the picture sequences are decoded.

Referring next to FIGS. 4A, 4B, 5A, and 6, flowcharts illustrating example operations of the decoder 10 are provided. In certain aspects, the flowcharts of FIGS. 4A, 4B, 5A, and 6 may be viewed as depicting example steps of a method of virtual field buffer based decoding 400. Although the processes of FIGS. 4A, 4B, 5A, and 6 are described in connection with the decoder 10 of FIG. 1, other decoders may operate according to the processes illustrated. Further, it should be understood that the flowcharts of FIGS. 4A, 4B, 5A, and 6 provide only examples of different functional or process arrangements that may be employed according to the embodiments described herein.

Figure 4A:
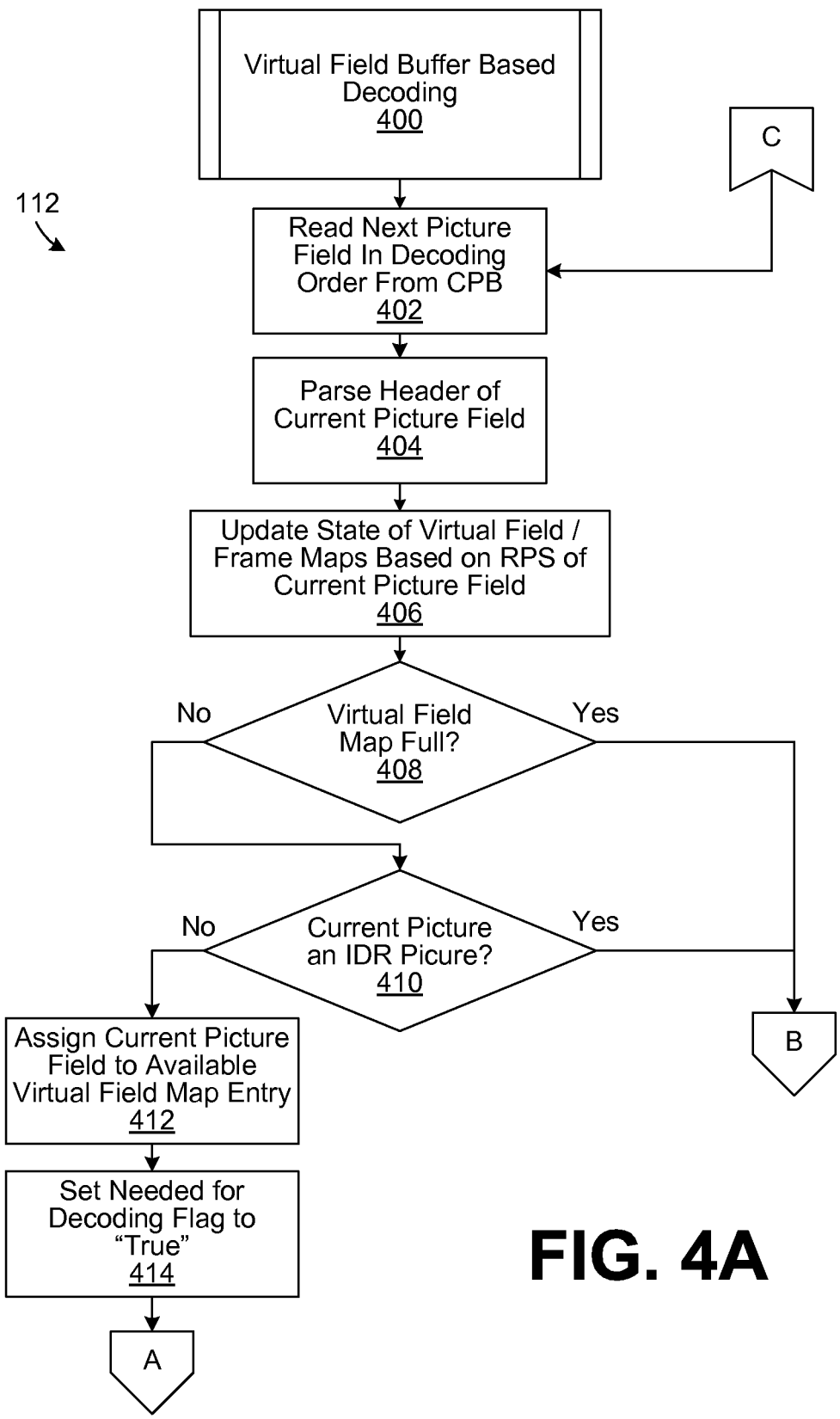
FIG. 4A illustrates an example process flow of a virtual field buffer based decoding process performed by the decoder of FIG. 1 according to an example embodiment.

FIG. 4A illustrates an example process flow of a virtual field buffer based decoding process 400 performed by the decoder 10 of FIG. 1 according to an example embodiment. For context, FIG. 4A is first described with reference to the first picture field T0 in the picture sequence 34 of FIG. 3B. It is noted that, before the process 400 begins, the picture command generator 112 may be initialized in certain aspects. The initialization includes initializing the virtual field and frame maps 212 and 214 and, in some aspects and embodiments, the virtual display queue 230 and the picture command queue 114. For example, the associated frame index, FrameIDX, of each entry in the virtual field map 212 and/or the virtual display queue 230 is set to an unassigned value of "−1". Additionally, during initialization, the counters of unpaired top and bottom field pictures are set to zero, the field entry available flags in the field map 212 are set to "true" (i.e., empty) values, the addresses of the frame map 214 are initialized, and all needed for decoding and needed for output flags are set to "true" values.

Beginning at reference 402, the syntax decoder 200 of the picture command generator 112 reads a next picture field (as the current picture) from the coded picture buffer 110. The next picture field may be read from the coded picture buffer 110 according to an order for decoding pictures stored within the coded picture buffer 110. With reference to FIG. 3B, for example, the syntax decoder 200 reads picture fields from the coded picture buffer 110 in the decoding order 0, 4, 2, 1, 3, with reference to the POC and display picture output order. Thus, as a first picture, the syntax decoder 200 reads the picture having the picture index 0 from the coded picture buffer 110.

At reference 404, the syntax decoder 200 parses a header of the current picture field. Additionally, at reference 406, the syntax decoder 200 updates a state of the virtual field DPB manager 210 according to the header of the current picture field. For example, at references 404 and 406, the syntax decoder 200 may determine a maximum size of a decoded picture buffer, reference pictures for the current picture field being decoded, and other information related to decoding.

At reference 408, the virtual field DPB manager 210 determines whether the virtual field map 212 is full. The virtual field DPB manager 210 may determine whether the virtual field map 212 is full according to or based on syntax layer data associated with the coded bitstream stored in the coded data buffer 110, for example. In one embodiment, the virtual field DPB manager 210 may determine whether the virtual field map 212 is full based on the maximum decoded picture buffer size maxDPBSize. In this case, the virtual field DPB manager 210 determines at reference 408 whether the current picture field read from the coded picture buffer 110 fills or exceeds the maximum size, maxDPBSize, of a "virtual" decoded picture buffer. Generally, a full virtual field map signifies that frame pairs in the virtual field and frame maps 212 and 214 and the virtual display queue 230 may be refreshed, flushed, or bumped out according to the process illustrated in FIG. 5A, described below. Thus, if the virtual field DPB manager 210 determines that the virtual field map 212 is full at reference numeral 408, the process proceeds to reference numeral 428 of FIG. 5A, as described below.

Alternatively, if the virtual field DPB manager 210 determines that the virtual field map 212 is not full, the process proceeds to reference numeral 410, where the virtual field DPB manager 210 determines whether the current picture field is an instantaneous decoder refresh (IDR) picture. It is noted that IDR pictures are generally found at the beginning of a sequence of coded pictures. An IDR picture can be decoded without decoding any previous pictures in a picture stream. Thus, an IDR picture signifies to the virtual field DPB manager 210 that the frame pairs in the virtual field and frame maps 212 and 214 may be refreshed, flushed, or bumped out according to the process steps illustrated in FIG. 5A. Thus, if the virtual field DPB manager 210 determines that the current picture field is an IDR picture field at reference numeral 410, then the process proceeds to reference numeral 428 of FIG. 5A, as described below.

On the other hand, if the virtual field DPB manager 210 determines that the current picture field is not an IDR picture field at reference numeral 410, the process proceeds to reference numeral 412. At reference numeral 412, the virtual field DPB manager 210 assigns the current picture field to an available field entry in the virtual field map 212 and the virtual display queue 230. Further, at reference numeral 414, the virtual field DPB manager 210 sets the needed for decoding flag of the current picture field to "true" in the virtual display queue 230. Additional use of the decoding flag is described below with reference to FIG. 6, for example.

Referring to the example picture sequence 34 illustrated in FIG. 3B, the picture field T0 is initially read from the coded picture buffer 110 by the picture command generator 112, according to the illustrated decoding order, at reference numeral 402. Because the picture field T0 is the first picture field in the picture sequence 34 and is not an IDR picture, the process proceeds to reference numeral 412, where the picture field T0 is assigned to an available field entry in the virtual field map 212. For example, the picture field T0 may be assigned to the available field entry "A" in the virtual field map 212. Further, at reference numeral 414, the needed for decoding flag of the picture field T0 is set to "true" in the virtual display queue 230.

Figure 4B:
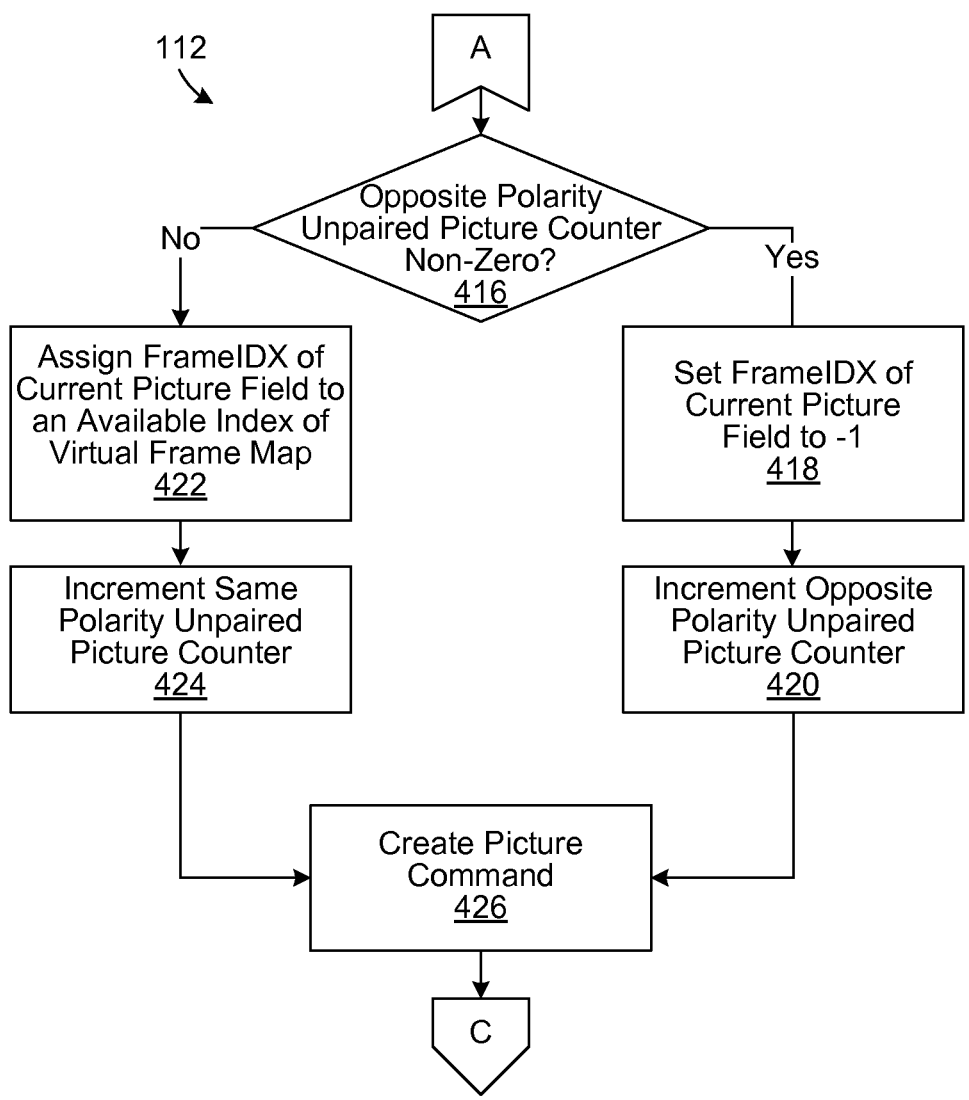
FIG. 4B further illustrates the example process flow of the virtual field buffer based decoding process performed by the decoder of FIG. 1 according to an example embodiment.

Turning to FIG. 4B, at reference numeral 416, the virtual field DPB manager 210 determines the polarity of the current picture field and whether the counter of unpaired pictures of the opposite field polarity as the current picture field is non-zero. If the counter of unpaired pictures of the opposite field polarity as the current picture field is non-zero, the process proceeds to reference numeral 418. At reference numeral 418, if the FrameIDX of the virtual field map entry assigned to the current picture at reference numeral 412 is not already initialized to the value of "−1", the FrameIDX value for the current picture is set to "−1". The assignment of "−1" to the FrameIDX value for the current picture specifies that the current picture is not assigned or paired to any particular frame index. Additionally, at reference numeral 420, the counter of unpaired pictures of the opposite field polarity as the current picture is incremented.

Alternatively, if the counter of unpaired pictures of the opposite field polarity as the current picture field is zero (i.e., not non-zero), the process proceeds to reference numeral 422. Referring to the example first picture field T0 in the decoding order of the picture sequence 34 of FIG. 3B, the virtual field DPB manager 210 determines that the polarity of the picture field T0 is "top" at reference numeral 416. Thus, because the polarity of the picture field T0 is "top", the virtual field DPB manager 210 determines whether the counter of top field pictures is non-zero at reference numeral 416. Because the picture command generator 112 was initialized before the process 400 began, the counter of top field pictures is determined to be zero at reference numeral 416, and the process proceeds to reference numeral 422.

At reference numeral 422, the virtual field DPB manager 210 assigns the current picture field to an available frame index of the virtual frame map 214. That is, the FrameIDX of the field map entry assigned to the current picture field at reference numeral 412 is assigned to an available frame index at reference numeral 422. In the context of the first picture field T0, the value of FrameIDX for T0 may be assigned to any available frame index. As one example, the value of FrameIDX for the picture field T0 may be assigned to frame index "1". In various embodiments, it is noted that the value assigned to FrameIDX corresponds to an address location in the frame-based DPB 118, and may be referenced by any pointer value corresponding to an address location in the frame-based DPB 118. Additionally, at reference numeral 424, the counter of unpaired pictures of the same field polarity as the picture field T0 is incremented.

After either reference numerals 420 or 424, a picture command for the current picture field is generated by the picture command manager 220 at reference numeral 426. Each picture command generated by the picture command generator 220 comprises picture and/or slice header data, picture and/or slice address data, a reference picture list, a field polarity, and a FrameIDX for the current picture, as illustrated in FIG. 2C. The picture commands, after being generated, are loaded to the picture command queue 114 by the picture command manager 220. After a picture command is generated for the current picture field at reference numeral 426, the process 400 proceeds back to reference numeral 402 of FIG. 4A, where the next picture in the decoding order is read from the coded picture buffer 110.

Figure 4C:
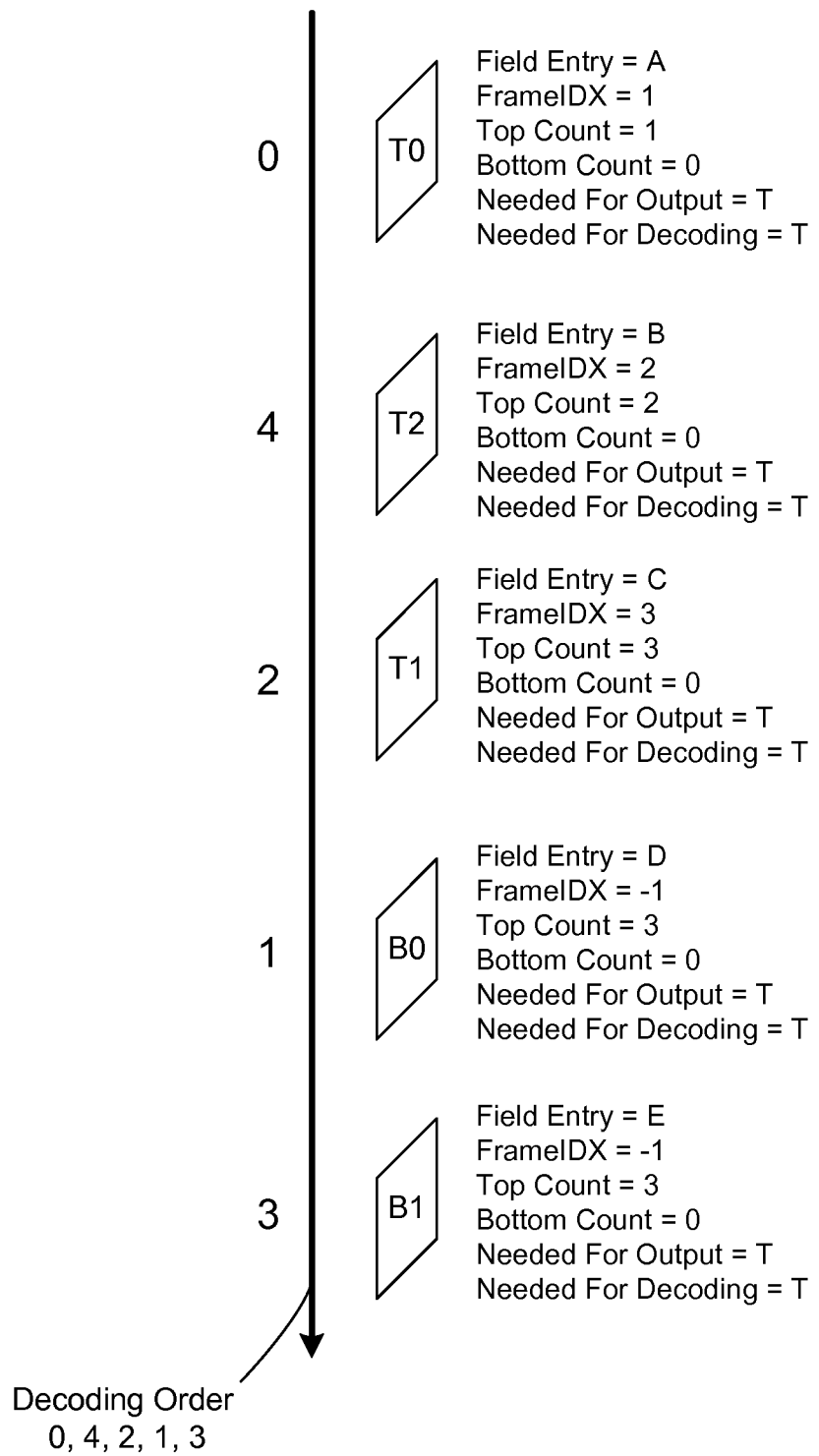
FIG. 4C illustrates example field and frame map assignments determined by the process illustrated in FIGS. 4A and 4B, for the example picture sequence illustrated in FIG. 3B.

FIG. 4C illustrates example virtual field and frame map assignments for the picture fields of the picture sequence 34 illustrated in FIG. 3B, as determined by the process 400 illustrated in FIGS. 4A and 4B. In FIG. 4C, each picture field in the example picture sequence 34 is illustrated in the decoding order of FIG. 3B, from top to bottom. As described above, the picture field T0 is assigned to the field entry "A" and the FrameIDX "1". Following the process 400 for the other picture fields in the decoding order illustrated in FIG. 3B, the picture fields T2, T1 , B0, and B1 are assigned field entries "B", "C", "D", and "E", respectively, at reference numeral 412. Also, the picture fields T2 and T1 are assigned FrameIDX values of "2" and "3", respectively, at reference numeral 422.

The picture fields B0 and B1, on the other hand, are left with initialized or unassigned "−1" FrameIDX values. This is due to the fact that the virtual field DPB manager 210 determines that the counter of unpaired pictures of the opposite field polarity as the picture fields B0 and B1 is non-zero at reference numeral 416 of FIG. 4B. Particularly, the counter of unpaired pictures of the opposite field polarity as the picture fields B0 and B1 is non-zero because it was incremented at reference numeral 424 of FIG. 4B for each of the picture fields T0, T2, and T1, because the picture fields T0, T2, and T1 were "top" picture fields read from the coded picture buffer 110 prior to the picture fields B0 and B1 in the decoding order.

According to the example picture sequence 34 of FIG. 3B, after reading the picture field B1 from the coded picture buffer 110, the next picture field is an IDR picture. Thus, the virtual field DPB manager 210 determines, at reference numeral 410, that the next picture after the picture field B1 is an IDR picture. In picture sequences other than the example picture sequence 34, the virtual field DPB manager 210 may determine that the virtual field map 212 is full at reference numeral 410, based on the maximum decoded picture buffer size maxDPBSize, as described above. In either case, the process 400 proceeds to reference numeral 428 of FIG. 5A to refresh, flush, or bump out any complementary picture field pairs from the virtual field and frame maps 212 and 214, according to the remaining elements of the process 400 illustrated in FIG. 5A.

Figure 5A:
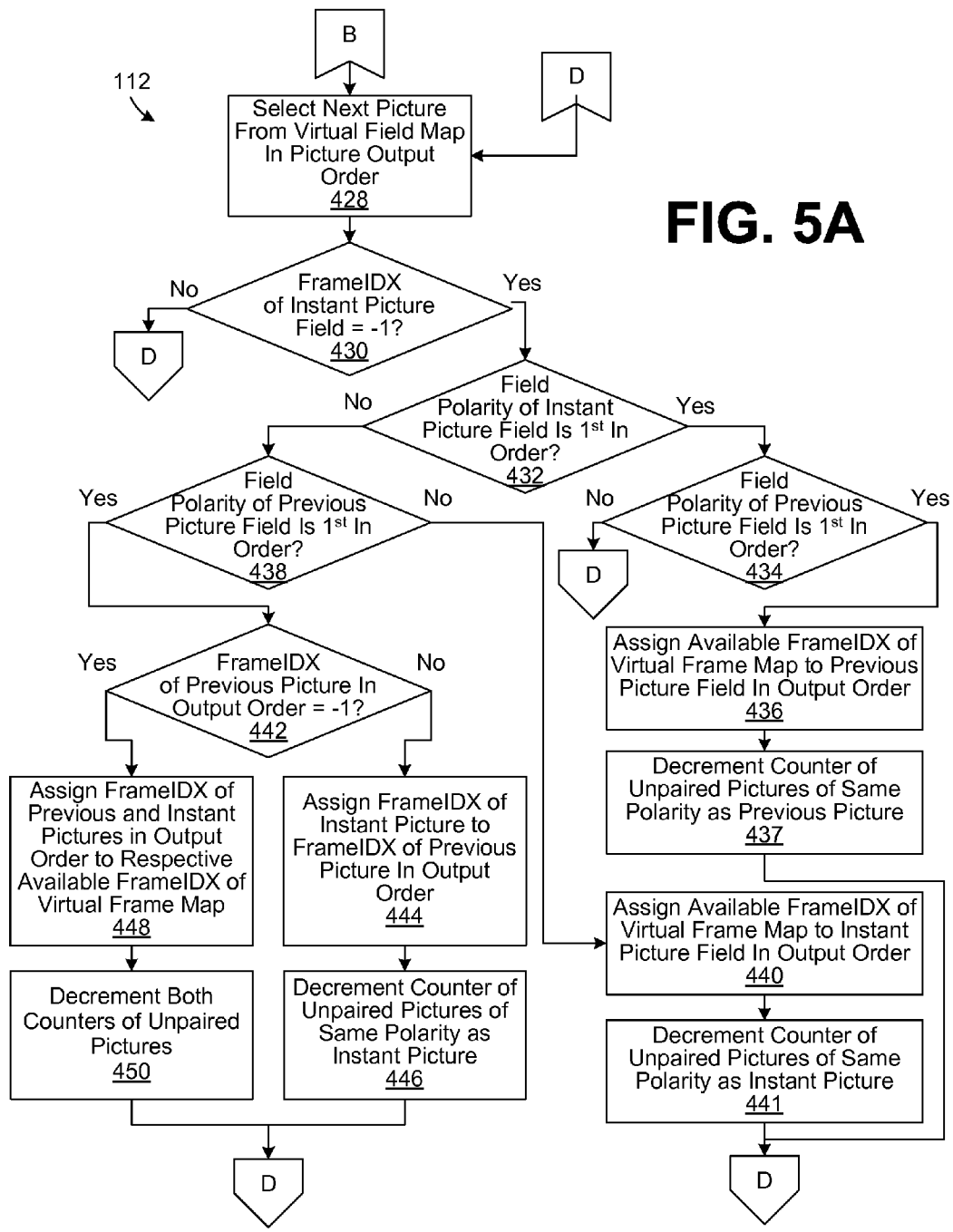
FIG. 5A further illustrates the example process flow of the virtual field buffer based decoding process performed by the decoder of FIG. 1 according to an example embodiment.

FIG. 5A further illustrates the example process flow of the virtual field buffer based decoding process 400 performed by the decoder 10 of FIG. 1 according to an example embodiment. The flow of the process illustrated in FIG. 5A is first described below without reference to any particular example sequence of pictures. Afterwards, the flow of the process illustrated in FIG. 5A is described in the context of the example picture sequence 34 of FIG. 3B, with reference to FIG. 5B.

At reference numeral 428, the virtual field DPB manager 210 selects, in the picture output order of the example picture sequence 34 of FIG. 3B, a next picture field (as the instant picture) from the virtual field map 212. The virtual field DPB manager 210 then determines at reference numeral 430 whether the FrameIDX of the instant picture field is unassigned or "−1". If the FrameIDX of the instant picture field is assigned, then the process proceeds back to reference numeral 428 to select the next picture field from the virtual field map 212 in the picture output order. Alternatively, if the FrameIDX of the instant picture field is determined to be unassigned at reference numeral 430, the process proceeds to reference numeral 432.

At reference numeral 432, the virtual field DPB manager 210 determines whether the field polarity of the instant picture field is first in the output order. In this context, the syntax decoder 200 may determine which field polarity (e.g., top or bottom) is first in the picture display output order, according to or based on syntax layer data associated with the coded bitstream stored in the coded data buffer 110, for example. If the field polarity of the instant picture field is first in the output order, then the process 400 proceeds to reference numeral 434. Alternatively, if the field polarity of the instant picture field is not first in the output order, the process 400 proceeds to reference numeral 438.

At reference numeral 434, the virtual field DPB manager 210 determines whether the field polarity of the previous picture field in the output order was first in the output order. If the field polarity of the previous picture field was first in the output order, then the process 400 proceeds to reference numeral 436. Alternatively, if the field polarity of the previous picture field was not first in the output order, the process 400 proceeds back to reference numeral 428. At reference numeral 436, the virtual field DPB manager 210 assigns an available FrameIDX of the virtual frame map 214 to the previous picture field in the picture output order.

It is noted that, in connection with reference numeral 436, the virtual field DPB manager 210 has determined that the previous picture field was a dangling picture field in the output order. As described herein, a dangling picture field is one that has no complimentary picture field for a frame. That is, some picture fields stored in the coded picture buffer 110 may not have a complimentary picture field for frame pairing. In that case, the process 400 identifies these fields and assigns them to available frame entries. After reference numeral 436, the process 400 proceeds to reference numeral 437, where the virtual field DPB manager 210 decrements the counter of unpaired pictures of the same polarity as the previous picture in the output order, and the process 400 proceeds back to reference numeral 428.

As noted above, if the field polarity of the instant picture field is not determined to be first in the output order at reference numeral 432, the process 400 proceeds to reference numeral 438. At reference numeral 438, the virtual field DPB manager 210 determines whether the field polarity of the previous picture field in the output order was first in the output order. If the field polarity of the previous picture field was first in the output order, the process 400 proceeds to reference numeral 442. Alternatively, if the field polarity of the previous picture field was not first in the output order, the process 400 proceeds to reference numeral 440. At reference numeral 440, the virtual field DPB manager 210 assigns an available FrameIDX of the virtual frame map 214 to the instant picture field in the picture output order. At reference numeral 440, the virtual field DPB manager 210 has determined that the instant picture field is a dangling picture field in the output order. After reference numeral 440, the process 400 proceeds to reference numeral 441, where the virtual field DPB manager 210 decrements the counter of unpaired pictures of the same polarity as the instant picture, and the process 400 proceeds back to reference numeral 428.

If the field polarity of the previous picture field was determined to be first in the output order at reference numeral 438, the process 400 proceeds to reference numeral 442. At reference numeral 442, the virtual field manager 210 determines whether the FrameIDX of the previous picture field in the output order was unassigned or "−1". If the FrameIDX of the previous picture field was assigned, the process 400 proceeds to reference numeral 444. Alternatively, if the FrameIDX of the previous picture field was unassigned, the process 400 proceeds to reference numeral 448.

At reference numeral 444, the virtual field DPB manager 210 assigns the FrameIDX of the instant picture field to the FrameIDX value of the previous picture in the picture output order. Further, at reference numeral 446, the virtual field DPB manager 210 decrements the unpaired picture counter of the same polarity as the instant picture. At reference numeral 448, the virtual field DPB manager 210 assigns the FrameIDX of the previous and instant picture fields to respective available FrameIDX values of the virtual frame map 214. Further, at reference numeral 450, the virtual field DPB manager 210 decrements both the top and bottom unpaired picture counters. After either reference numerals 450 or 446, the process proceeds back to reference numeral 428.

It is noted that, by the process elements illustrated in FIG. 5A, any unassigned FrameIDX values will be assigned. Thus, after selecting the last picture from the virtual field map 212 at reference numeral 428, the process 400 may proceed, in some embodiments, back to the process flow of FIGS. 4A and 4B, to begin assigning virtual field and frame values for other pictures stored in the coded data buffer 110. In certain aspects, some values in the virtual field and frame maps 212 and 214 may be initialized again before being associated with new pictures. It should also be appreciated that, that during the process 400, the decoder 116 continues to decode picture fields based on picture commands in the picture command queue 114, as further described below.

Figure 5B:
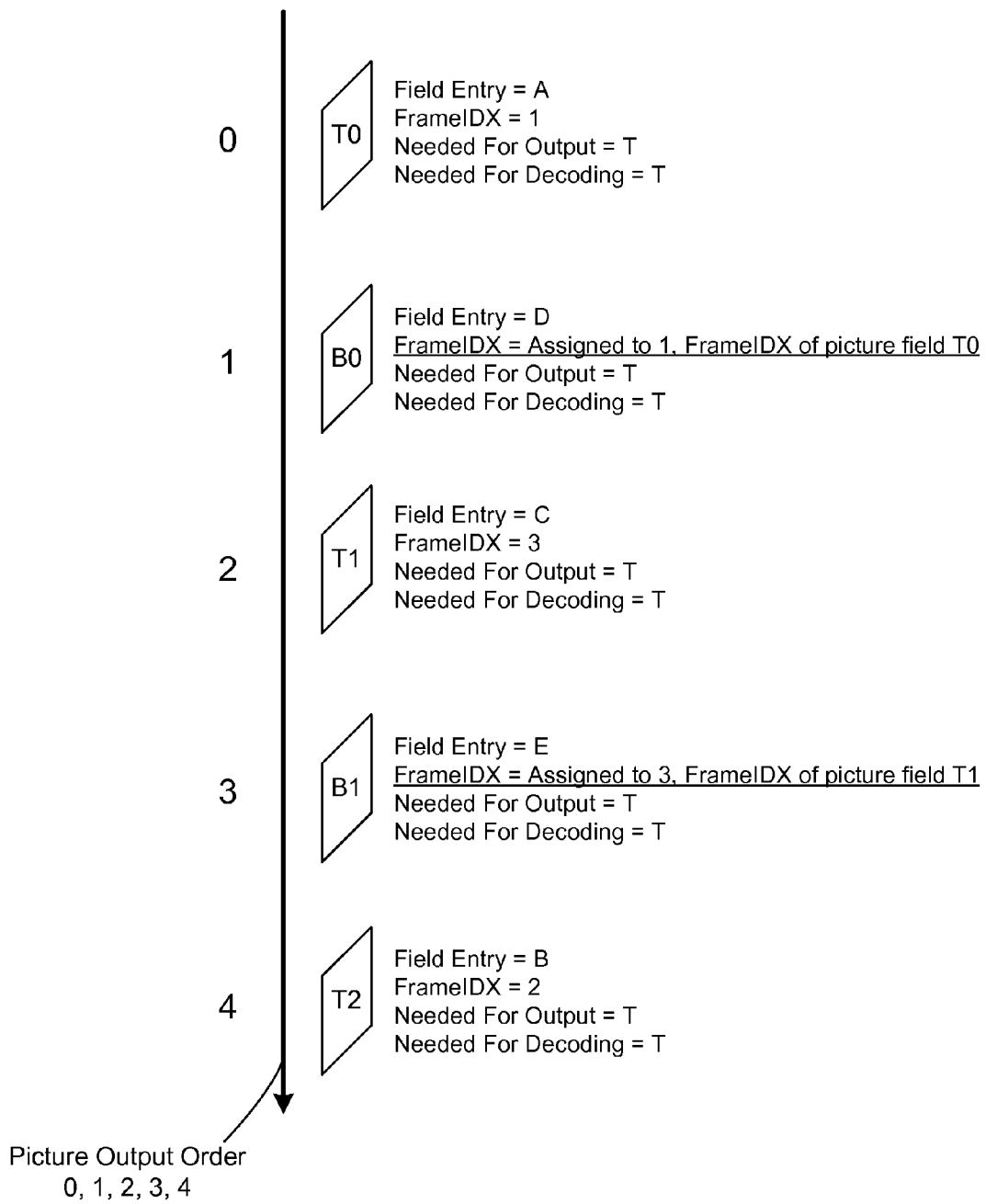
FIG. 5B illustrates example frame map assignments determined by the process illustrated in FIG. 5A, for the example picture sequence illustrated in FIG. 3B.

For additional context, the flow of the process elements illustrated in FIG. 5A is described in connection with the example picture sequence 34 of FIG. 3B, with reference to FIG. 5B. Referring to FIG. 5B, the first picture in the picture output order is picture field T0. At reference numeral 430 of FIG. 5A, the virtual field DPB manager 210 determines that the FrameIDX of the picture field T0 is assigned to "1". As such, the process 400 returns to reference numeral 428 to select the next picture field from the virtual field map 212. Following the picture output order illustrated in FIG. 5B, the next picture is picture field B0.

At reference numeral 430, the virtual field DPB manager 210 determines that the FrameIDX of the picture field B0 is unassigned or "−1". The process 400 then proceeds to reference numeral 432, where the virtual field DPB manager 210 determines that the field polarity of the picture field B0 is not first in the output order, because top field polarity is first in the example picture sequence 34. Thus, the process 400 proceeds to reference numeral 438, where the virtual field DPB manager 210 determines whether the field polarity of the previous picture field, T0, was first in the output order. Because the field polarity of the picture field T0, as a top polarity field, is first in the output order, the process 400 proceeds to reference numeral 442.

At reference numeral 442, the virtual field DPB manager 210 determines whether the FrameIDX of the previous picture T0 was unassigned or "−1". In this case, the FrameIDX of the previous picture T0 is assigned to "1", as illustrated in FIG. 5B. Thus, the process 400 proceeds to reference numeral 444. At reference numeral 444, the virtual field DPB manager 210 assigns the FrameIDX of the picture field B0 to the FrameIDX value of the previous picture, T0, in the picture output order. That is, the virtual field DPB manager 210 assigns the FrameIDX of the picture field B0 to the FrameIDX value "1", because "1" is the FrameIDX value of the previous picture field T0. Further, at reference numeral 446, the virtual field DPB manager 210 decrements the unpaired picture counter of bottom pictures.

Continuing in the context of the example picture sequence 34 referenced in FIG. 5B, the process 400 proceeds back to reference numeral 428 of FIG. 5A, where the next picture field in the picture output order, T1, is selected. Because the FrameIDX of the picture field T1 is determined to be assigned at reference numeral 430, the process 400 then selects B1 as the next picture field in the picture output order. The assignment of the FrameIDX of the picture field B1 follows a similar path in FIG. 5A as compared to the picture field B0 described above. Particularly, at reference numeral 444, the virtual field DPB manager 210 assigns the FrameIDX of the picture field B1 to the FrameIDX value of the previous picture, T1, in the picture output order. That is, the virtual field DPB manager 210 assigns the FrameIDX of the picture field B1 to the FrameIDX value "3", because "3" is the FrameIDX value of the previous picture field T1.

Here, it is noted that the picture fields T0 and B0 have been assigned to the same FrameIDX value of "1" and the picture fields T1 and B1 have been assigned to the same FrameIDX value of "3". Thus, picture fields T0 and B0 have been identified as a pair of complimentary fields, and the picture fields T1 and B1 have been identified as a pair of complimentary fields. Each of the pairs may be output as a frame on the display 122, for example, as a progressive scan image in connection with a deinterlacing operation, for example. Upon assignment of a FrameIDX value, the decoder 116 may proceed to decode the picture fields B0 and B1, and store the picture fields T0 and B0 and T1 and B1 in the frame-based DPB 118. Generally, the decoder 116 decodes any picture having a picture command associated with an assigned FrameIDX value.

Particularly, in operation, the decoder 116 selects one of the picture commands CMD 0, CMD 1, CMD 2, . . . , and CMD N, etc. from the picture command queue 114. In various embodiments, the picture commands may be selected by the decoder 116 in the sequence the commands were generated by the picture command manager 220, for example, or in any other suitable sequence. The decoder 116 first determines if the FrameIDX value of the selected picture command is assigned. That is, because each picture command is assigned or associated with a field of the virtual field map 212 and the virtual display queue 230, the decoder 116 determines whether the FrameIDX of that picture field has been assigned to a frame index value. If so, the decoder decodes the picture field associated with the selected picture command, according to the addressing and other parameters of the picture command. After decoding the picture field, the needed for decoding flag of the decoded picture field is set to "false" in the virtual field map 212 and the virtual display queue 230. The needed for decoding flags are relied upon by the display output process 600 of FIG. 6, described below.

Turning to FIG. 6, an example process flow of a display output process 600 performed by the decoder 10 of FIG. 1 is illustrated according to an example embodiment. The process 600 is relied upon by the decoder 10 to output complimentary pairs of picture fields that have been identified as being associated with a same picture frame. Generally, in the process 600, the virtual field DPB manager 210 outputs complimentary picture fields from the virtual display queue 230 to the display queue 120. As described above, the display queue 120 stores references to picture frames for output by the display 122. The references stored in the display queue 120 may refer to storage locations in the frame-based DPB 118. Thus, with reference to the display queue 120, the display 122 retrieves and displays picture frames from the frame-based DPB 118.

In various embodiments, the process 600 may be invoked or started at various points in the flow of the process 400, or at other suitable times, as determined by the decoder 10. For example, the process 600 may be invoked or started each time a picture field stored in the coded picture buffer 110 is decoded by the decoder 116. Alternatively or additionally, the process 600 may be invoked or started each time the virtual display queue 230 is loaded with another picture field in the picture output order.

Starting at reference numeral 602 of FIG. 6, the virtual field DPB manager 210 selects the next picture from the virtual display queue 230. In exemplary embodiments, the picture fields Field 0, Field 1, Field 2, . . . , and Field N in the virtual display queue 230 are stored or ordered in the picture output order by the virtual field DPB manager 210. At reference numeral 604, the virtual field DPB manager 210 determines whether the needed for decoding flag of the selected picture is "false". In other words, the virtual field DPB manager 210 determines whether picture field selected at reference numeral 602 has been decoded by the decoder 116. If not, the process ends. On other hand, if the picture field selected at reference numeral 602 has been decoded, the process 600 proceeds to reference numeral 606.

At reference numeral 606, the virtual field DPB manager 210 determines whether the field polarity of the selected picture field is first in the picture output order. As described above, the syntax decoder 200 may determine which field polarity (e.g., top or bottom) is first in output order according to or based on syntax layer data associated with the coded bitstream stored in the coded data buffer 110, for example. If the field polarity of the selected picture field is not first in the picture output order, the process 600 proceeds to reference numeral 610. At reference numeral 610, the picture field selected at reference numeral 602 is output to the display queue 120 as a dangling field. In other words, the picture field selected at reference numeral 602 is one that has no complimentary picture field for a frame.

Alternatively, if the field polarity of the selected picture field is first in the output order, the process 600 proceeds to reference numeral 608. At reference numeral 608, the virtual field DPB manager 210 selects the next picture in the picture output order from the virtual display queue 230. At reference numeral 612, the virtual field DPB manager 210 determines whether the needed for decoding flag of the selected picture is "false". In other words, the virtual field DPB manager 210 determines whether picture field selected at reference numeral 608 has been decoded by the decoder 116. If not, the process ends. On other hand, if the picture field selected at reference numeral 608 has been decoded, the process 600 proceeds to reference numeral 614.

At reference numeral 614, the virtual field DPB manager 210 determines whether field polarity of the selected picture field is second in the picture output order. If the field polarity of the selected picture field is not second in the picture output order, the process 600 proceeds to reference numeral 618. At reference numeral 618, the previous picture field (i.e., the picture field previously selected at reference numeral 602) is output to the display queue 120 as a dangling field. In other words, the picture field selected at reference numeral 602 is one that has no complimentary picture field for a frame.

Alternatively, if the field polarity of the picture field selected at reference numeral 608 is determined to be second in the output order at reference numeral 614, the process 600 proceeds to reference numeral 616. At reference numeral 616, the virtual field DPB manager 210 outputs the picture fields selected at reference numerals 602 and 608 to the display queue 120 as a complimentary field pair. The process 600 the proceeds back to reference numeral 602 to determine whether additional fields are available in the virtual display queue.

Based on the process 600, complimentary picture fields identified by the picture command generator 112 are output in terms of frame pairs to the display queue 120, after they have been decoded by the decoder 116. Thus, the picture command generator 112 operates as a type of virtual decoded picture buffer, by assigning picture fields to frames and ordering the picture fields and frames into the picture output order, while the decoder 116 works to decode the picture fields from the coded picture buffer. It is again noted that, according to aspects of the embodiments described herein, rather than determining complimentary picture fields after decoding, for example, the assignment of complimentary picture fields to frames before and/or during decoding provides certain efficiencies and further supports interlaced video coding and decoding when relying upon certain standards such as HEVC.

Figure 7:
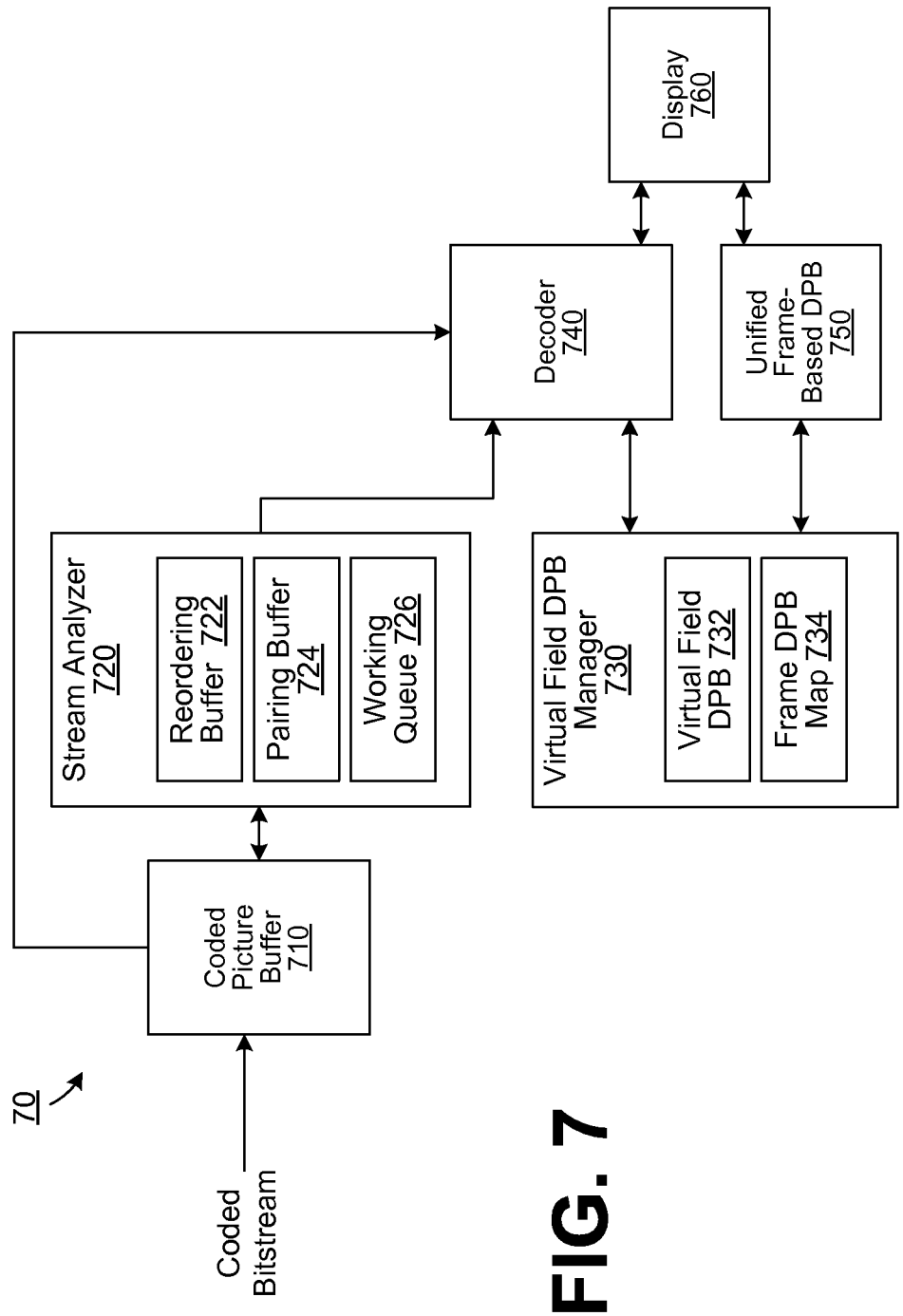
FIG. 7 illustrates an example virtual field buffer decoder that incorporates a unified decoded picture buffer according to another embodiment described herein.

Turning to another embodiment described herein, FIG. 7 illustrates an example virtual field buffer decoder 70 that incorporates a unified DPB. As illustrated, the virtual field buffer decoder 70 is based on a unified DPB and comprises a coded picture buffer 710, a stream analyzer 720, a virtual field DPB manager 730, a decoder 740, a unified frame-based DPB 750, and a display 760. As compared to the virtual field buffer decoder 10 of FIG. 1, the coded picture buffer 710, the decoder 740, and the display 760 of the virtual field buffer decoder 70 of FIG. 7 are similar to the coded picture buffer 110, the decoder 116, and the display 122 of FIG. 1, respectively. As illustrated in FIG. 7, the stream analyzer 720 comprises a reordering buffer 722, a pairing buffer 724, and a working queue 726. Further, the virtual field DPB manager 730 comprises a virtual field DPB 732 and a frame DPB map 734.

Generally, the virtual field buffer decoder 70 pairs fields before decoding and stores decoded field pairs (i.e., as frames) in the unified frame-based DPB 750. In certain aspects, the unified frame-based DPB 750 is similar to a DPB in an MPEG-4 AVC/H.264 decoder that contains frame buffers. After decoding by the decoder 740, two decoded complementary field pictures are stored together in the unified frame-based DPB 750. The stream analyzer 720, as further described below, performs a process to pair picture fields and allocate frame buffers of the unified frame-based DPB 750 to store decoded pictures in pairs.

Figure 8:
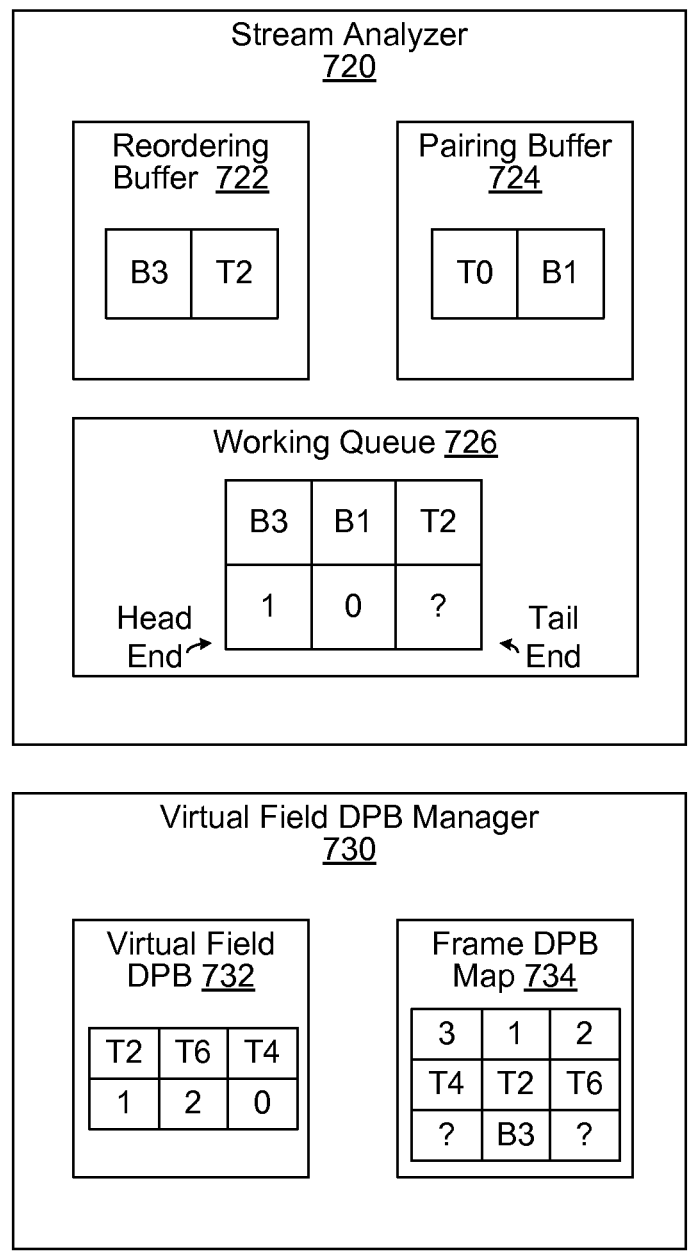
FIG. 8 illustrates elements of a stream analyzer and a virtual field DPB manager of the virtual field buffer decoder of FIG. 7, with example working field values according one embodiment described herein.

FIG. 8 illustrates the elements of the stream analyzer 720 and the virtual field DPB manager 730 of FIG. 7, with example working field values according one embodiment described herein. In connection with FIG. 8, an overall description of the operation of the stream analyzer 720 and the virtual field DPB manager 730 is provided. The stream analyzer 720 scans the coded bitstream in the coded picture buffer 710, detects complementary field pairs, assigns a frame number to the complementary field pairs, and sends field entries to the decoder 740 for decoding.

As illustrated in FIG. 8, the stream analyzer 720 maintains the reordering buffer 722, the pairing buffer 724, and the working queue 726. It should be appreciated that the sizes of the reordering buffer 722, the pairing buffer 724, and the working queue 726 illustrated in FIG. 8 are provided by way of example only and may vary among embodiments depending upon parameters of a GOP or coded bitstream of pictures, for example. In the stream analyzer 720 illustrated in FIG. 8, Tn represents a top field with POC n, Bn represents a bottom field with POC n, the bottom row of the working queue 726 is associated with assigned frame numbers, and "head" and "tail" ends of the working queue 726 are illustrated. In certain aspects and embodiments, each of the reordering buffer 722, the pairing buffer 724, and the working queue 726 includes a pointer to a field entry. Each field entry includes parameters such as a field parity flag, a POC, a frame number, and a starting address of a corresponding field in the coded picture buffer 710, for example.

When the stream analyzer 720 detects a new field in the coded picture buffer 710, the stream analyzer 720 inserts a new field entry in both the reordering buffer 722 and the tail end of the working queue 726. A field parity and POC number for the new detected field may be parsed from a slice header of the new field by the stream analyzer 720 and stored in the parameters for the field. In turn, the stream analyzer 720 uses the reordering buffer 722 to reorder fields from a decoding order of pictures in the coded picture buffer 710 to a picture output order for display to the display 760 (FIG. 7). It may be assumed that all fields are to be output. When the current field is an IDR or a broken link access (BLA) field, the fields in the reordering buffer 722 are output from the reordering buffer to the pairing buffer in an ascending order of POC. Otherwise, when the current field is not an IDR or a BLA field, it is noted that HEVC provides a sequence layer parameter, max_num_reorder_pics, to indicate a maximum allowed number of pictures preceding any picture in decoding order and succeeding that picture in output order. If a number of populated fields in the reordering buffer 722 is larger than max_num_reorder_pics, then the field with a lowest POC in the reordering buffer 722 is output from the reordering buffer 722 to the pairing buffer 724 when a new field is added to the reordering buffer 722.

The stream analyzer 720 uses the pairing buffer 724 to pair two complementary fields. When two fields are present in the pairing buffer 724, these two fields are regarded as a complementary field pair. The stream analyzer 720 assigns a frame buffer index to either one or both of the two fields in the pairing buffer 724, according to the rules described below, and the two fields may then be output from the pairing buffer 724 together.

The working queue 726 is a first-in-first-out queue that tracks all fields to be decoded. Each time a frame number is assigned to a field in the working queue 726 or a field in the working queue 726 is decoded, the stream analyzer 720 checks the first field entry (i.e., at the head end) of the working queue 726. If the first field entry at the head end of the working queue 726 contains a valid (e.g., assigned) frame number, the field associated with the entry will be removed from the working queue 726 and sent to the decoder 740 for decoding.

Decoded complementary field pair pictures are stored into a frame buffer of the unified frame-based DPB 750, in association with an assigned frame number for the complementary field pair. A frame number is assigned to a current field according to one or more rules of the stream analyzer 720. First, if there are no unpaired fields with an opposite parity as the current field in the reordering buffer 722 and the pairing buffer 724, the current field is considered to be a first field of a field pair in decoding order. Thus, a new frame number is assigned to the current field by the stream analyzer 720. Second, when a pair of fields is present or assigned in the pairing buffer 724, if one of them has a valid or assigned frame number, then that assigned frame number is assigned to the other field in the pairing buffer 724. Otherwise, when a pair of fields is present in the pairing buffer 724, if neither of them has a valid or assigned frame number, then a new frame number is assigned to both fields in the pairing buffer 724.

Referring again to FIG. 8, the virtual field DPB manager 730 receives field DPB operations from the decoder 740 and performs mapping operations to the unified frame DPB 750. The virtual field DPB manager 730 maintains the virtual field DPB 732 and the frame DPB map 734. It should be appreciated that the sizes of the virtual field DPB 732 and the frame DPB map 734 illustrated in FIG. 8 are provided by way of example only and may vary among embodiments depending upon parameters of a GOP or coded bitstream of pictures, for example. In the virtual field DPB manager 730 illustrated in FIG. 8, the bottom row of the virtual field DPB 732 and the top row of the frame DPB map 734 are associated with assigned frame numbers. In the virtual field DPB 732, each field entry is associated with or points to a frame buffer index (i.e., the assigned frame numbers) of the unified frame-based DPB 750. The assigned frame numbers are also used as pointers for lookup in the frame DPB map 734. In one embodiment, each frame entry in the frame DPB map 734 includes, for example, an available flag, a frame number, a pair of field entries, and an address of a frame buffer. Each field entry includes a field parity flag, a POC, an output flag and a removed flag.

In one embodiment, three types of DPB operations including insertion, output, and removal operations are mapped from the virtual field DPB 732 to the unified frame-based DPB 750 through the frame DPB map 734. After a field is decoded by the decoder 740, it is inserted into the virtual field DPB 732. When a current field is inserted into the virtual field DPB 732, if there is a frame entry in the frame DPB map 734 that has a same frame number as the current field, then the current field is a complementary field of that frame entry and is associated with that frame entry. Otherwise, if there is no frame entry in the frame DPB map 734 that has a same frame number as the current field, the current field is inserted into a new frame entry and the frame number of that frame entry is set equal to the frame number of the current field. In both cases, the frame buffer index of the current field is set equal to the index of the frame entry.

When a field is output from the virtual field DPB 732, an output flag of the corresponding field entry in the frame DPB map 734 is set as "true". If the output flag of its complementary field in the same frame entry is also "true", then the field pair will be output together and sent to the display 760. When a current field is removed from the virtual field DPB 732, a removed flag of the frame DPB map 734 for the current field will be set as "true". If the removed flag of the complementary field to the current field is also "true", the frame entry will be emptied and the available flag is set to be "true". Using the algorithm described above, fields may be decoded while frame numbers are assigned, although the assignment of frame numbers to respective fields by the stream analyzer 720 may require the detection and/or analysis of more than one field to detect the resulting frame pair.

In a playback mode of locally-stored coded pictures, the stream analyzer 720 may look ahead to detect field pairs, and latency may be ignored in certain aspects. In a streaming mode where coded pictures may not be locally-stored in an entire sequence or group of pictures (GOP), however, the stream analyzer 720 may need to wait for several fields to arrive in the coded picture buffer 710 before resulting frame pairs can be detected. Thus, in some aspects, an increase in an initial buffering delay may occur for a decoding system. In this context, latency in the above-noted streaming mode is described below in connection with FIGS. 9A and 9B. The discussion starts with a latency analysis of an IBBP GOP structure of intra-coded I fields, and inter-coded B- and P-fields, and then suggests a more general case of latency for GOP structures.

Figure 9A:
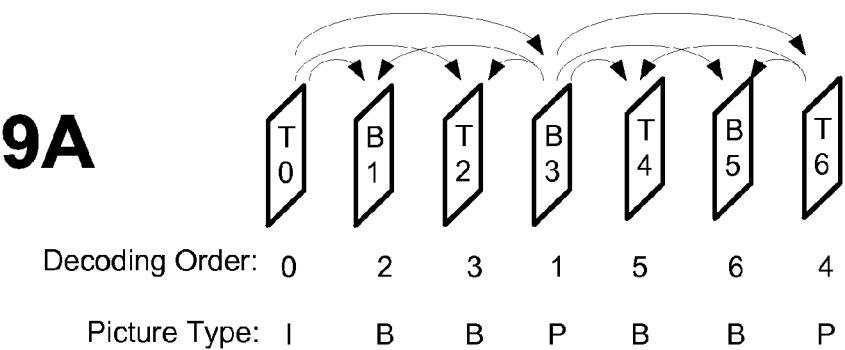
FIG. 9A illustrates an example field IBBP GOP structure sequence for the decoder of FIG. 7 according to an example embodiment.

FIG. 9A illustrates an example field IBBP GOP structure sequence. In FIG. 9A, the decoding order and picture type of each example field is also illustrated. Here, it is noted that, for each P-field, one reference field is used for decoding. For each B-field, two reference fields are used for decoding.

Figure 9B:
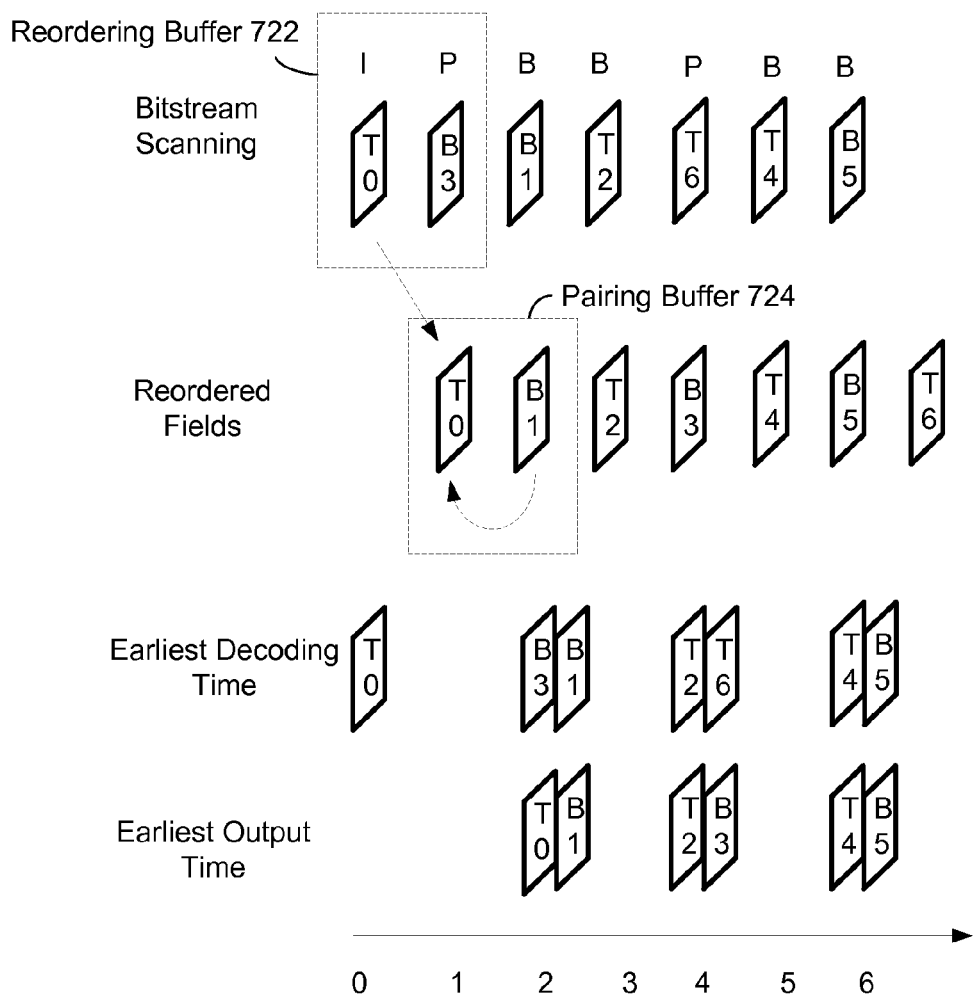
FIG. 9B illustrates an example decoding process for the IBBP GOP structure sequence of FIG. 9A, performed by the decoder of FIG. 7, according to an example embodiment.

FIG. 9B illustrates an example decoding process for the IBBP GOP structure sequence of FIG. 9A, performed by the decoder 70 of FIG. 7. For the IBBP GOP structure sequence of FIG. 9A, it is assumed that the value of max_num_reorder_pics is equal to 1. At the outset, according to the processes of the stream analyzer 720 discussed above, because the first field in the decoding order, T0, is a first field of a field pair, a frame number "0 " is assigned to it as it arrives in the coded picture buffer 710. Particularly, when the first field T0 is identified in the coded picture buffer 710 by the stream analyzer 720, no other fields are present or identified in the working queue 726. At this time, T0 enters the tail end of the reordering buffer 722 and is sent to the decoder 740.

Next, the second field in the decoding order, bottom field B3, arrives. According to the processes of the stream analyzer 720 discussed above, since there is an unpaired top field T0 in the reordering buffer 722, a frame number is not assigned to the field B3 by the stream analyzer 720. Thus, B3 enters the reordering buffer 722 and the tail end of the working queue 726. Since max_num_reorder_pics is equal to 1, the field with the lowest POC, T0, is output from the reordering buffer 722 to the pairing buffer 724.

The bottom field B1 arrives next in the decoding order. Because there is an unpaired top field T0 in the reordering buffer 722, a frame number is not assigned to the field B1 by the stream analyzer 720. The field B1 enters the reordering buffer 722 and the tail end of the working queue 726, following B3. Again, the field with the lowest POC, B1, is output from the reordering buffer 722 to the pairing buffer 724.

The pairing buffer now has two fields, T0 and B1, and a field pair is detected. The frame number "0" of the field T0 is assigned to the field B1, according to the processes of the stream analyzer 720 discussed above, and both the T0 and B1 fields are output from the pairing buffer 724. Because, at this time, B3 becomes the only unpaired field in the reordering buffer 722, a new frame number "1" is assigned to B3. Since both B3 and B1 now have a frame number, they are removed from the working queue 726 and sent to the decoder 740 sequentially. The decoded results of T0 and B1 are saved in a single frame buffer since both of them are assigned to the frame number "0". When the decoder 740 completes decoding T0, B3, and B1, T0 and B1 are output from the virtual field DPB buffer 732. Since both fields of the frame "0" are output from the virtual field DPB 732, frame "0" is output for display to the display 760. As compared with a decoding system that combines two fields in a frame after decoding, the decoder 70 does not incur an extra delay or any extra combining process.

For a more general coding structure, field pairing latency depends not only on a maximum allowed number of pictures preceding any picture in decoding order and succeeding that picture in output order, but also on the maximum number of pictures that can precede any picture in output order and follow that picture in decoding order. The first number is specified by max_num_reorder_pics and the second is specified by MaxLatencyPictures in the HEVC specification. Particularly, there can be at most max_num_reorder_pics+MaxLatencyPictures fields between two complementary fields. Furthermore, it takes at most MaxLatencyPicture+1 fields to output both of them from the reordering buffer to the pairing buffer. Thus, the maximum decoding latency is max_num_reorder_pics+2×MaxLatencyPictures+1. An extra latency compared with the decoding system in FIG. 2 is 2×MaxLatencyPictures. Note that the latency can be combined with the initial buffering delay to reduce the total decoding system latency.

Figure 10:
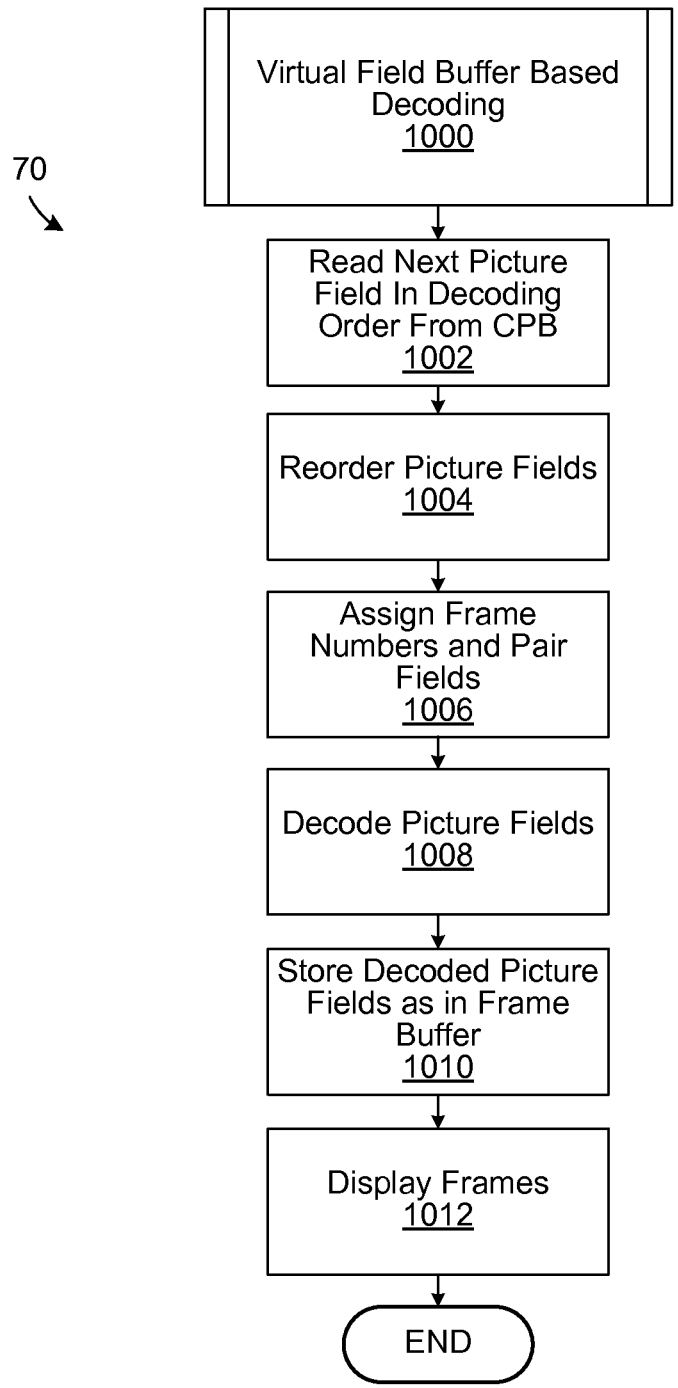
FIG. 10 illustrates an example process flow of a virtual field buffer based decoding process performed by the decoder of FIG. 7 according to an example embodiment.

Referring next to FIG. 10, a flowchart illustrating example operations of the decoder 70 of FIG. 7 are provided. In certain aspects, the flowchart of FIG. 10 may be viewed as depicting example steps of a method of virtual field buffer based decoding 1000. Although the processes of FIG. 10 are described in connection with the decoder 70 of FIG. 7, other decoders may operate according to the processes illustrated. Further, it should be understood that the flowchart of FIG. 10 provide only one example of different functional or process arrangements that may be employed according to the embodiments described herein.

FIG. 10 illustrates an example process flow of a virtual field buffer based decoding process 1000 performed by the decoder 70 of FIG. 7 according to an example embodiment. At reference numeral 1002, a next picture in a decoding order is read from a coded picture buffer. For example, when the first field T0 (and other later fields) is identified in the coded picture buffer 710 by the stream analyzer 720, it may be read from the coded picture buffer 710. Continuing to reference numeral 1004, the picture fields read from the coded picture buffer 710 are reordered. For example, according to the processes of the stream analyzer 720 discussed above, fields read from the coded picture buffer 710 may be reordered in the reordering buffer 722 and the working queue 726, as discussed above in connection with FIGS. 8, 9A, and 9B.

Continuing to reference numeral 1006, picture fields read from the coded picture buffer 710 are assigned frame numbers and assigned to frames. For example, according to the processes of the decoder 70 discussed above, fields read from the coded picture buffer 710 may be assigned frame numbers and assigned to frames in the pairing buffer 724, the virtual field DPB 732, and the frame DPB map 734, as discussed above in connection with FIGS. 8, 9A, and 9B. At reference numeral 1008, picture fields read from the coded picture buffer 710 are decoded. With reference to the decoder 70 of FIG. 7, picture fields read from the coded picture buffer 710 may be decoded by the decoder 740.

At reference numeral 1010, decoded picture fields may be stored in pairs as frames. In one embodiment, the picture fields may be stored in the unified frame-based DPB 750. Finally, at reference numeral 1012, the decoded picture fields may be output to a display as a frame. The display 760 of the decoder 70 of FIG. 7 may be relied upon in this context, to display decoded pictured from the unified frame-based DPB 750.

In other aspects and embodiments, it is noted that an explicit frame number may be provided, per picture field in a coded bitstream, at the side of an encoder. This explicit frame number may be provided for each field picture so that a decoder can use the number to pair two fields together. Thus, as decoding is being performed according to a decoding order, as noted in the various embodiments above, the frame assignments of the individually-decoded fields may be tracked in a virtual field DPB, such as the virtual field DPB manager 730 of the decoder 70 of FIG. 1. In this manner, fields may be paired before (and during) decoding of pictures, and a frame-based DPB may be used to store pairs of picture fields as frames, for later display. In this case, frame numbers for each picture field in the coded picture buffer 710, for example, are assigned by an encoder and the decoder 70 of FIG. 7 may determine frame numbers for each picture field by referring to assignments of frame numbers provided by the encoder.

In still other aspects and embodiments, the above-described aspects of field pairing and the assignment of frame numbers for field pairs may be applied to various operations performed in connection with decoding. For example, the aspects of field pairing and frame number assignment described above may be applied to trick modes, such as fast forward and reverse mode operations. To achieve trick play effects, algorithms rely upon manipulation of video streams at picture boundaries. However, for the support of these trick play effects, frame numbers of fields of pictures should be known at the side of the decoder.

As one example, as described in "AVS trick modes for PVR and VOD services," Signal Processing: Image Communication, Vol. 24. Issue 4, pp. 300-311, April 2009, which is hereby incorporated herein by reference in its entirety, a certain count (i.e., a skip count) of frames may be skipped as part of a command for a trick mode. In this context, the skip count represents a number of frames to be decoded but not displayed as part of a trick play effect. Here, it is noted that certain initial pictures may be required to be decoded, if they are predictive frames for a final frame to be displayed, for example, even if the initial pictures are not ultimately displayed. In this case, the aspects of field pairing and the assignment of frame numbers for field pairs may be applied to determine field pairs of frames that are decoded and displayed, or decoded but not displayed.

Figure 11:
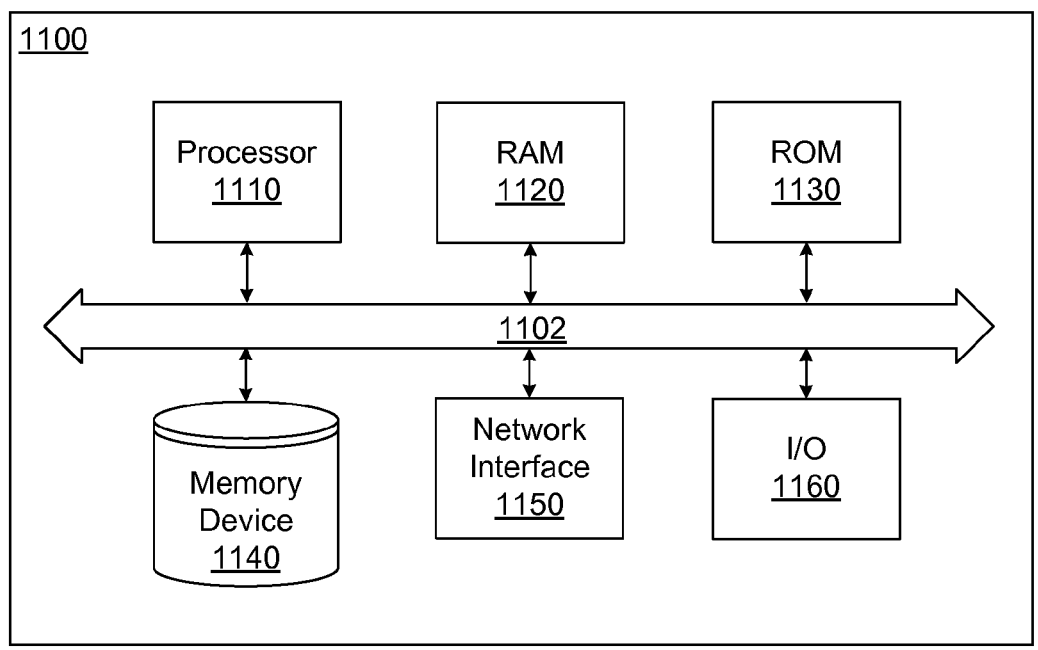
FIG. 11 illustrates an example schematic block diagram of a computing device that may be employed by decoders of various embodiments described herein.

FIG. 11 illustrates an example schematic block diagram of a computing device 1100 that may be employed by the decoder 10 of FIG. 1 or the decoder 70 of FIG. 7, according to various embodiments described herein.

The computing device 1100 may be embodied, in part, using one or more elements of a general purpose computer. The computing device 1100 includes a processor 1110, a Random Access Memory ("RAM") 1120, a Read Only Memory ("ROM") 1130, a memory device 1140, a network interface 1150, and an Input Output ("I/O") interface 1160. The elements of computing device 1100 are communicatively coupled via a bus 1102. The elements of the computing device 1100 are not intended to be limiting in nature, as the device may further include other elements.

In various embodiments, the processor 1110 may comprise any well-known general purpose arithmetic processor, state machine, or Application Specific Integrated Circuit ("ASIC"), for example. In one embodiment, the decoder 10 of FIG. 1 or the decoder 70 of FIG. 7 may be implemented, in part, by the processor 1110. The processor 1110 may include one or more circuits, one or more microprocessors, ASICs, dedicated hardware, or any combination thereof. In certain aspects embodiments, the processor 1110 is configured to execute one or more software modules. The processor 1110 may further include memory configured to store instructions and/or code to various functions, as further described herein. In certain embodiments, the processor 1110 may comprise a state machine or ASIC, and the processes described in FIGS. 4A, 4B, 5A, 6, and 10 may be implemented or executed by the state machine or ASIC according to a specialized or embedded circuitry design, by firmware, or a combination of a circuitry and firmware.

The RAM and ROM 1120 and 1130 comprise any well-known random access and read only memory devices that store computer-readable instructions to be executed by the processor 1110. The memory device 1140 stores computer-readable instructions thereon that, when executed by the processor 1110, direct the processor 1110 to execute various aspects of the embodiments described herein.

As a non-limiting example group, the memory device 1140 comprises one or more of an optical disc, a magnetic disc, a semiconductor memory (i.e., a semiconductor, floating gate, or similar flash based memory), a magnetic tape memory, a removable memory, combinations thereof, or any other known non-transitory memory means for storing computer-readable instructions. The network interface 1150 comprises hardware interfaces to communicate over data networks. The I/O interface 1160 comprises device input and output interfaces, such as keyboard, pointing device, display, communication, and/or other interfaces. The bus 1102 electrically and communicatively couples the processor 1110, the RAM 1120, the ROM 1130, the memory device 1140, the network interface 1150, and the I/O interface 1160, so that data and instructions may be communicated among them.

In certain aspects, the processor 1110 is configured to retrieve computer-readable instructions and data stored on the memory device 1140, the RAM 1120, the ROM 1130, and/or other storage means, and copy the computer-readable instructions to the RAM 1120 or the ROM 1130 for execution, for example. The processor 1110 is further configured to execute the computer-readable instructions to implement various aspects and features of the embodiments described herein. For example, the processor 1110 may be adapted or configured to execute the processes described above with reference to FIGS. 4A, 4B, 5A, 6, and 10. In embodiments where the processor 1110 comprises a state machine or ASIC, the processor 1110 may include internal memory and registers for maintenance of data being processed.

The flowcharts or process diagrams of FIGS. 4A, 4B, 5A, 6, and 10 are representative of certain processes, functionality, and operations of embodiments discussed herein. Each block may represent one or a combination of steps or executions in a process. Alternatively or additionally, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 1110. The machine code may be converted from the source code, etc. Further, each block may represent, or be connected with, a circuit or a number of interconnected circuits to implement a certain logical function or process step.

Although the flowcharts or process diagrams of FIGS. 4A, 4B, 5A, 6, and 10 illustrate an order, it is understood that the order may differ from that which is depicted. For example, an order of execution of two or more blocks may be scrambled relative to the order shown. Also, two or more blocks shown in succession in FIGS. 4A, 4B, 5A, 6, and 10 may be executed concurrently or with partial concurrence. Further, in some embodiments, one or more of the blocks shown in FIGS. 4A, 4B, 5A, 6, and 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method of virtual field buffer based decoding, comprising:
    according to a first decoding order, reading a current picture field from a coded picture buffer, the current picture field having a field polarity;
    assigning the current picture field to an available field entry of a virtual field buffer;
    assigning an available frame index of a virtual frame map to the current picture field;
    determining that a counter of unpaired pictures of an opposite field polarity as the current picture field is zero;
    responsive to the counter being zero, assigning the frame index of the current picture field to an available frame index of the virtual frame map and incrementing a counter of unpaired pictures of a same field polarity as the current picture field; and
    decoding, by a decoder, the current picture field in a second decoding order based on the assigned frame index of the current picture field.

2. The method of claim 1, further comprising parsing a header of the current picture field and updating the virtual field buffer based in part on a reference picture set of the current picture field.

3. The method of claim 1, wherein:
    reading a current picture field from the coded picture buffer further comprises,
        for each current picture field of a plurality of picture fields to be decoded, reading the current picture field from the coded picture buffer according to the first decoding order; and
    the method further comprises,
        for each current picture field read from the coded picture buffer, assigning the current picture field to an available field entry of the virtual field buffer.

4. The method of claim 3, further comprising, for each current picture field read from the coded picture buffer:
    determining that the counter of unpaired pictures of the opposite field polarity as the current picture field is non-zero; and
    responsive to the counter of unpaired pictures of the opposite field polarity being non-zero, setting a frame index of the current picture field to an unassigned state and incrementing the counter of unpaired pictures of the opposite field polarity.

5. The method of claim 3, further comprising, when the virtual field buffer is full or an instantaneous decoder refresh is identified, determining a frame index of at least one frame-unassigned picture field in the virtual field buffer.

6. The method of claim 5, wherein determining a frame index of at least one frame-unassigned picture field comprises determining frame indexes of each frame-unassigned picture field in the virtual field buffer.

7. The method of claim 5, wherein determining a frame index of a frame-unassigned picture field comprises:
   selecting an instant picture field from the virtual field buffer according to a picture output order; and
   when a frame index of the instant picture field is unassigned, assigning the frame index of the instant picture field according to at least one of a field polarity of the instant picture field and an assigned frame index of a previous picture field in the picture output order.

8. The method of claim 5, wherein determining frame indexes of each frame-unassigned picture field comprises:
   for each picture field in the virtual field buffer, selecting the picture field as an instant picture field according to a picture output order; and
   for each instant picture field, when a frame index of the instant picture field is unassigned, a field polarity of the instant picture field is first in output order, and an assigned field polarity of a previous picture field in the picture output order is first in output order, assigning an available frame index of the virtual frame map to the previous picture field.

9. The method of claim 5, wherein determining frame indexes of each frame-unassigned picture comprises:
   for each picture field in the virtual field buffer, selecting the picture field as an instant picture field according to the picture output order; and
   for each instant picture field, when a frame index of the instant picture field is unassigned, a field polarity of the instant picture field is not first in output order, and an assigned field polarity of a previous picture field in the picture output order is not first in output order, assigning an available frame index of the virtual frame map to the instant picture field.

10. A device for virtual field buffer based decoding, comprising:
   a syntax decoder that reads a current picture field from a coded picture buffer according to a first decoding order and parses a header of the current picture field, the current picture field having a field polarity;
   a virtual decoded picture buffer (DPB) manager that:
      assigns the current picture field to an available field entry of a virtual field buffer; and
      assigns an available frame index of a virtual frame map to the current picture field;
      determines that a counter of unpaired pictures of an opposite field polarity as the current picture field is zero;
      responsive to the counter being zero, assigns the frame index of the current picture field to an available frame index of the virtual frame map and increments a counter of unpaired pictures of a same field polarity as the current picture field; and
   a decoder that decodes the current picture field according to a second decoding order determined based on the assigned frame index of the current picture field.

11. The device of claim 10, wherein the virtual DPB manager further:
   reads, for each current picture field of a plurality of picture fields to be decoded, the current picture field from the coded picture buffer according to the first decoding order; and
   assigns, for each current picture field read from the coded picture buffer, the current picture field to an available field entry of the virtual field buffer.

12. The device of claim 11, wherein, for each current picture field read from the coded picture buffer, the virtual DPB manager further:
   determines that the counter of unpaired pictures of the opposite field polarity as the current picture field is non-zero; and
   responsive to the counter of unpaired pictures of the opposite field polarity being non-zero, sets a frame index of the current picture field to an unassigned state and increments the counter of unpaired pictures of the opposite field polarity.

13. The device of claim 11, wherein, when the virtual field buffer is full or an instantaneous decoder refresh is identified, the virtual DPB manager further determines at least one frame index of a frame-unassigned picture field in the virtual field buffer.

14. The device of claim 11, wherein, when the virtual field buffer is full or an instantaneous decoder refresh is identified, the virtual DPB manager further determines determining frame indexes of each frame-unassigned picture field in the virtual field buffer.

15. The device of claim 11, wherein, when the virtual field buffer is full or an instantaneous decoder refresh is identified, the virtual DPB manager further:
   selects an instant picture field from the virtual field buffer according to a picture output order; and
   when a frame index of the instant picture field is unassigned, assigns the frame index of the instant picture field according to at least one of a field polarity of the instant picture field and an assigned frame index of a previous picture field in the picture output order.

16. A method of decoding, comprising:
   for each picture field in a group of pictures in a coded picture buffer:
      reading a picture field from the coded picture buffer;
      assigning the picture field to a buffer;
      determining a frame number for the picture field among picture fields in the group of pictures;
      determining that a counter of unpaired pictures of an opposite field polarity as the picture field is zero;
      responsive to the counter being zero, assigning the frame number of the picture field to an available frame index of the virtual frame map and incrementing a counter of unpaired pictures of a same field polarity as the picture field;
      decoding, by a decoder, the picture field, in a decoding order according to the determined frame number; and
      storing the picture field in a frame-based decoded picture buffer.

17. The method of claim 16, wherein:
   each picture field is read from the coded picture buffer according to the decoding order; and
   the method further comprises, for each picture field read from the coded picture buffer, assigning the picture field in a pairing buffer for assigning a frame number.

18. The method of claim 17, further comprising:
   when a pair of fields is assigned in the pairing buffer, if one of the pair of fields is assigned to a frame number, assigning another of the pair of fields to the frame number; and when the pair of fields is assigned in the pairing buffer, if neither of the pair of fields is assigned to a frame number, assigning each of the pair of fields to a same frame number.

19. The method of claim 16, wherein the frame numbers are determined for each picture field in the group of pictures in the coded picture buffer to support a trick play effect.

20. The method of claim 16, wherein frame numbers for each picture field in the coded picture buffer are assigned by an encoder and determining the frame number for each picture field comprises referring to assignments of frame numbers by the encoder.

21. The method of claim 1, wherein assigning the available frame index to the current picture field further comprises:
   determining whether a counter of unpaired pictures of an opposite field polarity as the current picture field is non-zero,
   when the counter of unpaired pictures of the opposite field polarity is non-zero, setting a frame index of the current picture field to an unassigned state and incrementing the counter of unpaired pictures of the opposite field polarity, and
   when the counter of unpaired pictures of the opposite field polarity is zero, assigning the frame index of the current picture field to an available frame index of the virtual frame map and incrementing a counter of unpaired pictures of a same field polarity as the current picture field; and wherein decoding the current picture field further comprises determining a frame index of at least one frame-unassigned picture field in the virtual field buffer, responsive to a determination that the virtual field buffer is full or an identification of an instantaneous decoder refresh.

22. The method of claim 1, further comprising:
reading a next current picture field;
assigning the next current picture field to an available field entry of the virtual field buffer;
assigning an available frame index of the virtual frame map to the next current picture field;
determining that a counter of unpaired pictures of an opposite field polarity as the next current picture field is non-zero;
responsive to the counter of unpaired pictures of the opposite field polarity as the next current picture field being non-zero, setting a frame index of the next current picture field to an unassigned state and incrementing the counter of unpaired pictures of the opposite field polarity; and
decoding, by the decoder, the next current picture field in a third decoding order based on the assigned frame index of the next current picture field.

23. The method of claim 22, further comprising:
determining a frame index of at least one frame-unassigned picture field in the virtual field buffer responsive to a determination that the virtual field buffer is full or an instantaneous decoder refresh is identified.

* * * * *